United States Patent
DeFoe et al.

(10) Patent No.: US 10,399,215 B2
(45) Date of Patent: Sep. 3, 2019

(54) FASTENING TOOL FOR ROOFING FASTENERS WITH PLATE WASHERS

(71) Applicant: SFS intec Holding AG, Heerbrugg (CH)

(72) Inventors: Terry DeFoe, Noblesville, IN (US);
Bronson Hiatt, Noblesville, IN (US);
S. Riaz Hasan, Noblesville, IN (US);
David Brown, Wyomissing, PA (US);
Larry Hilovsky, Wyomissing, PA (US);
Daniel Scheerer, Wyomissing, PA (US); Jarrod Woodland, Wyomissing, PA (US)

(73) Assignee: SFS intec Holding AG, Heerbrugg (CH)

(*) Notice: Subject to any disclaimer, the term of this patent is extended or adjusted under 35 U.S.C. 154(b) by 257 days.

(21) Appl. No.: 15/617,511

(22) Filed: Jun. 8, 2017

(65) Prior Publication Data

US 2017/0355067 A1    Dec. 14, 2017

Related U.S. Application Data

(60) Provisional application No. 62/347,169, filed on Jun. 8, 2016.

(51) Int. Cl.
| | | |
|---|---|---|
| *B25B 21/00* | (2006.01) | |
| *B25B 23/00* | (2006.01) | |
| *B25B 23/04* | (2006.01) | |
| *E04D 15/00* | (2006.01) | |
| *B23P 19/08* | (2006.01) | |
| *E04D 15/04* | (2006.01) | |
| *E04D 15/06* | (2006.01) | |

(52) U.S. Cl.
CPC ............ *B25B 21/002* (2013.01); *B23P 19/08* (2013.01); *B25B 23/0007* (2013.01); *B25B 23/04* (2013.01); *E04D 15/00* (2013.01); *E04D 15/06* (2013.01); *E04D 2015/047* (2013.01)

(58) Field of Classification Search
CPC ... B25B 21/002; B25B 23/04; B25B 23/0007; E04D 15/06; E04D 15/00
See application file for complete search history.

(56) References Cited

U.S. PATENT DOCUMENTS

| | | | | | |
|---|---|---|---|---|---|
| 5,056,684 | A | * | 10/1991 | Beach | B25B 23/04 221/186 |
| 5,347,707 | A | * | 9/1994 | Beach | B25B 21/002 29/787 |
| 5,445,297 | A | * | 8/1995 | Beach | B25B 21/002 221/257 |
| 5,673,816 | A | * | 10/1997 | Larson | B25B 21/002 221/197 |
| 5,921,454 | A | * | 7/1999 | Larson | B25B 21/002 227/107 |

\* cited by examiner

*Primary Examiner* — Ryan J. Walters
(74) *Attorney, Agent, or Firm* — Volpe and Koenig, P.C.

(57) ABSTRACT

A fastener installation tool is provided for installing threaded fasteners through a washer plate having a center hole used in connection with roofing membrane installation. The installation tool is configured to receive different types of washer plates, and is easily dis-assembleable in the field without the need for tools in order to easily and simply clear jams.

21 Claims, 22 Drawing Sheets

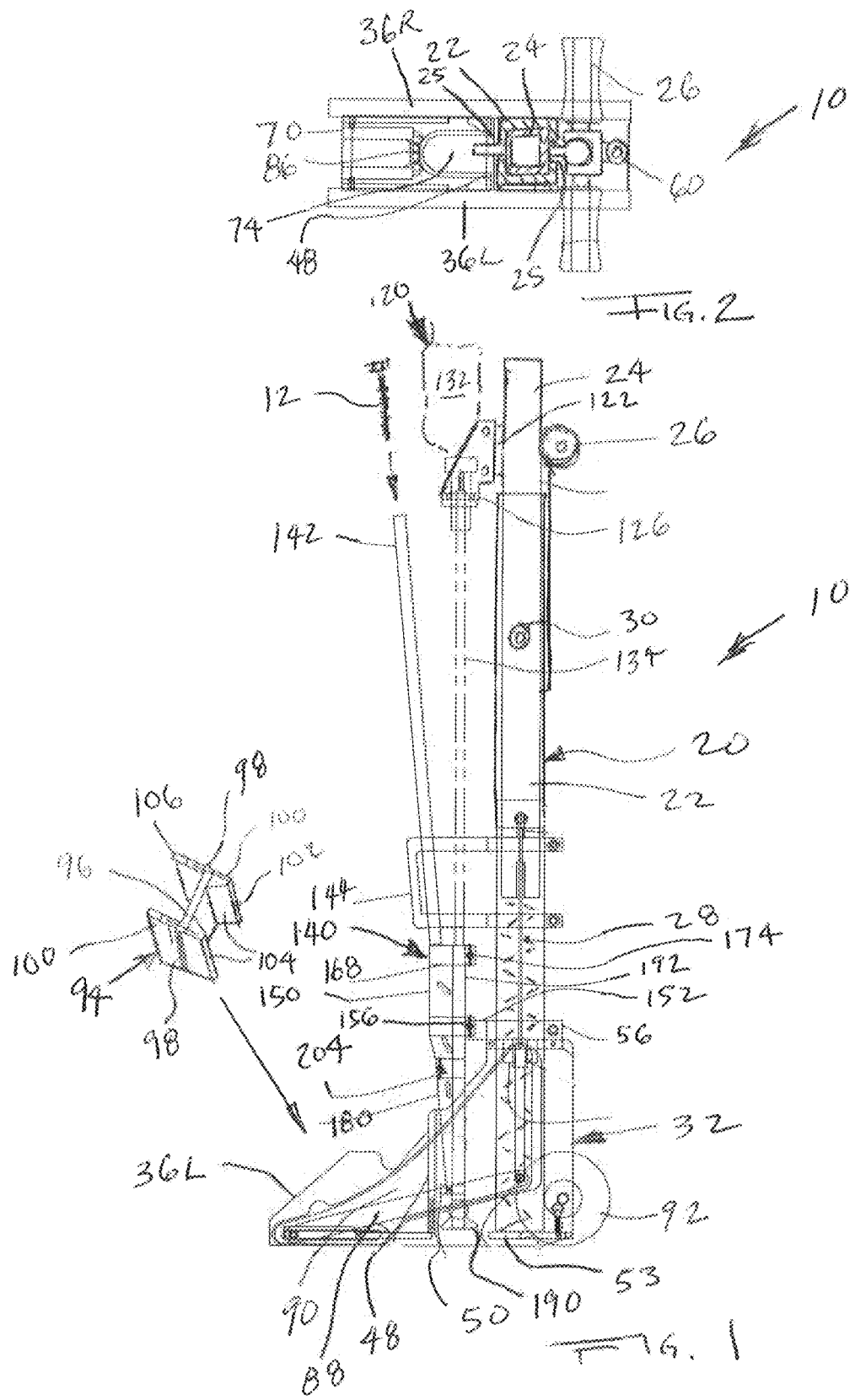

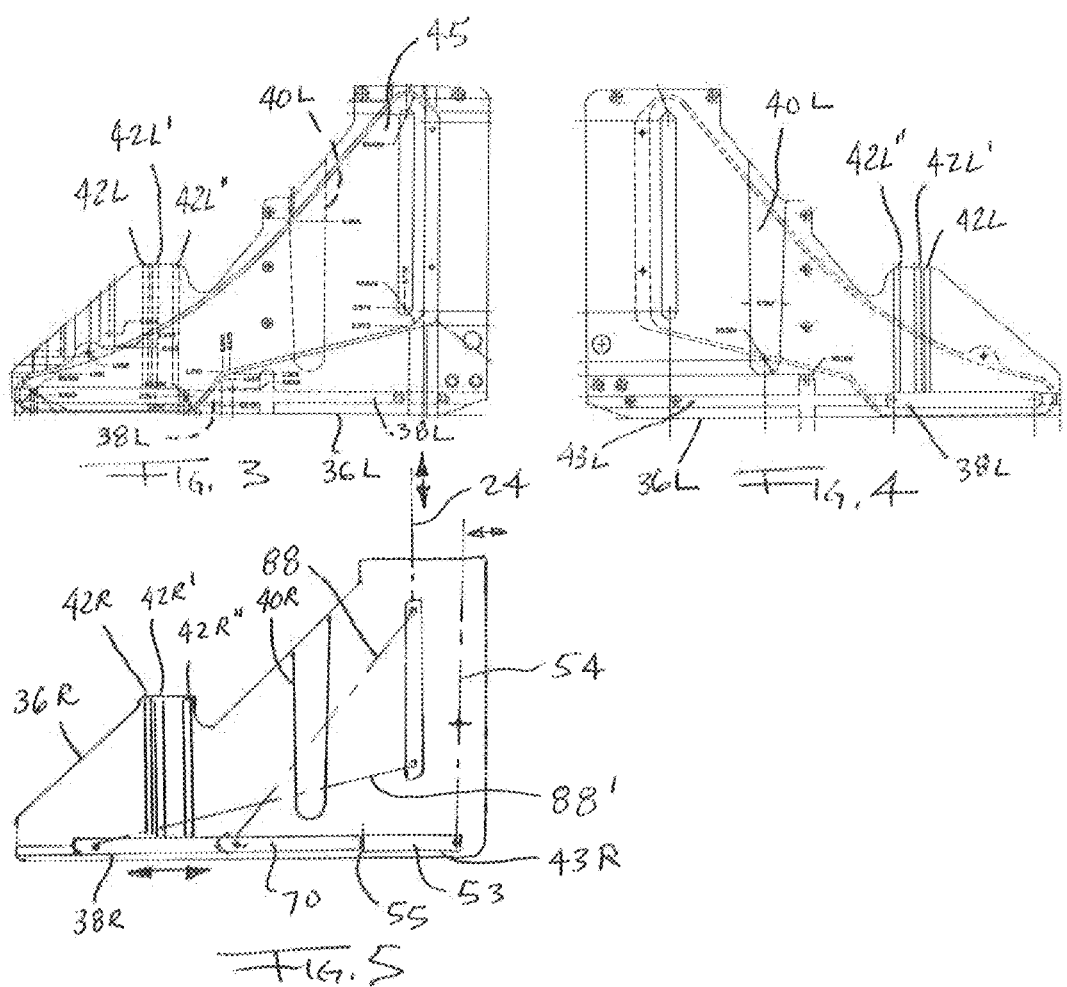

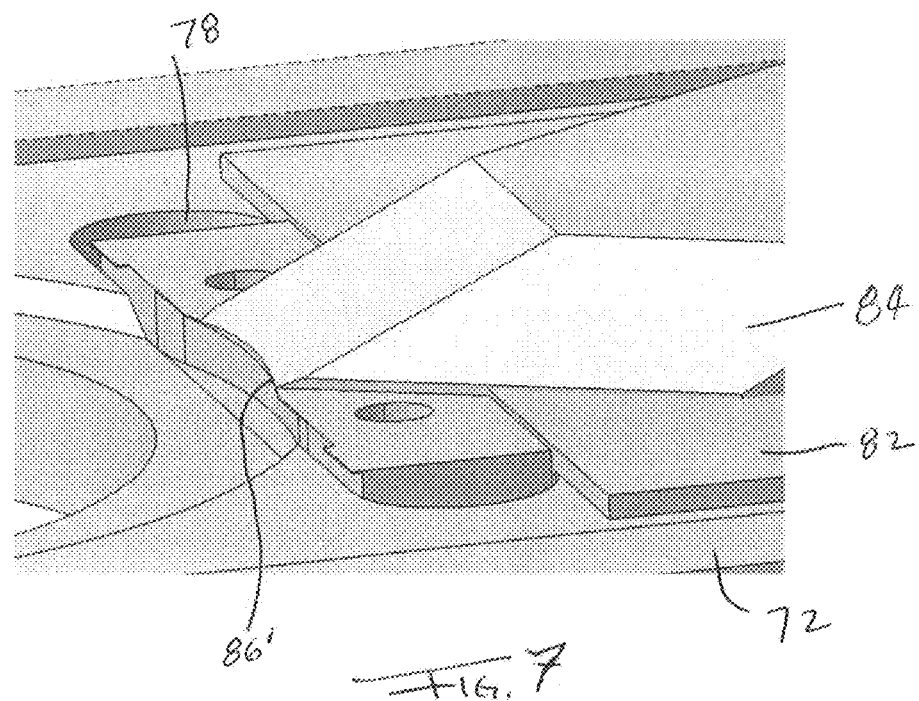
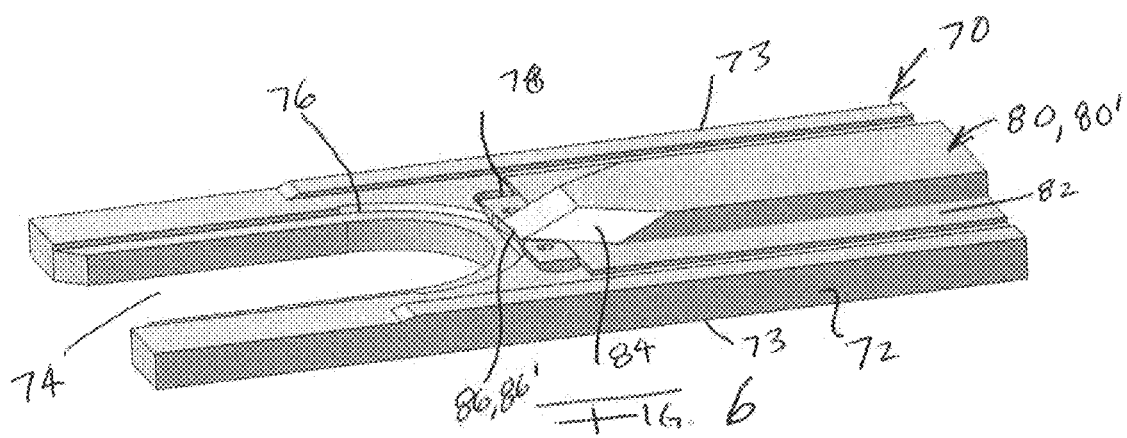

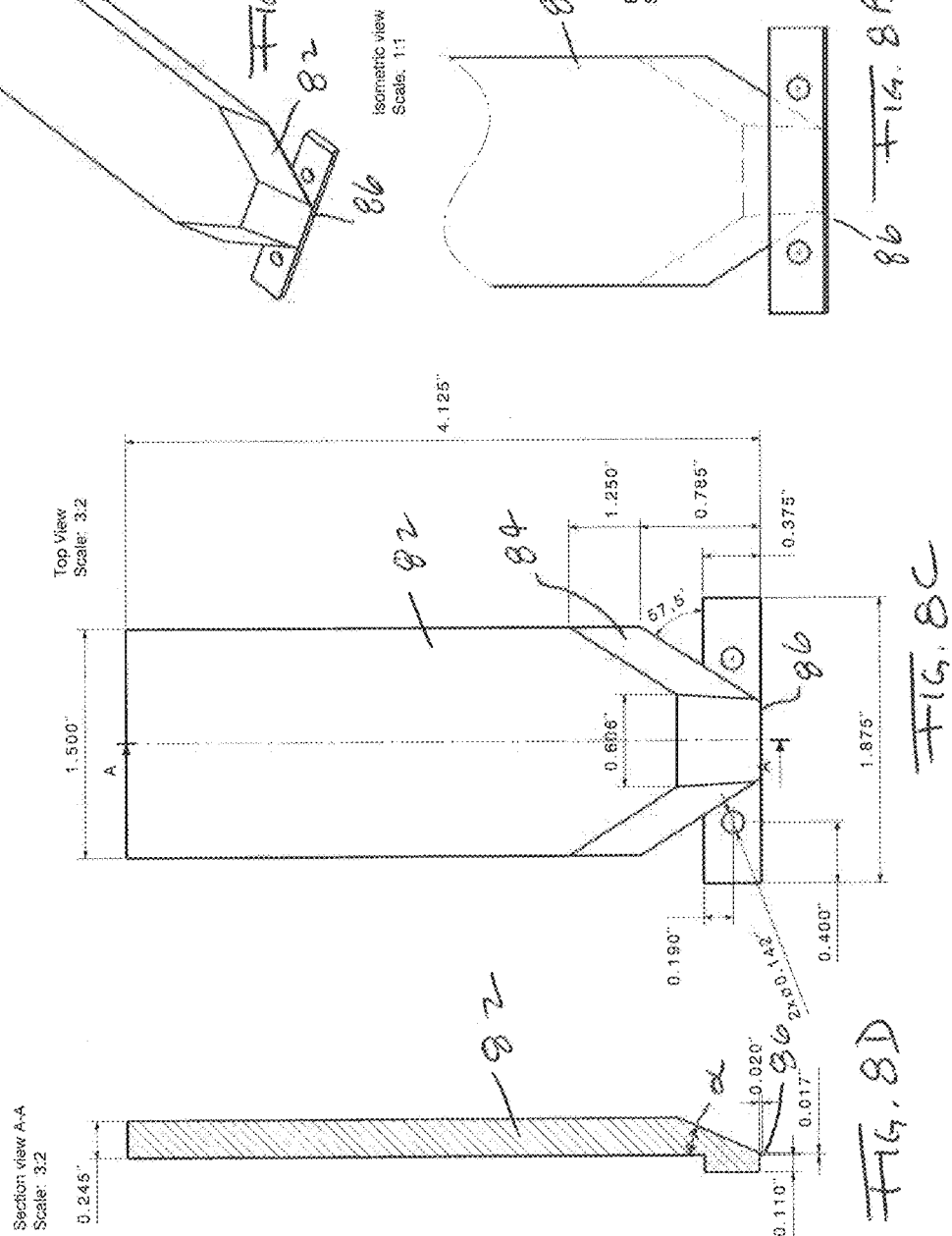

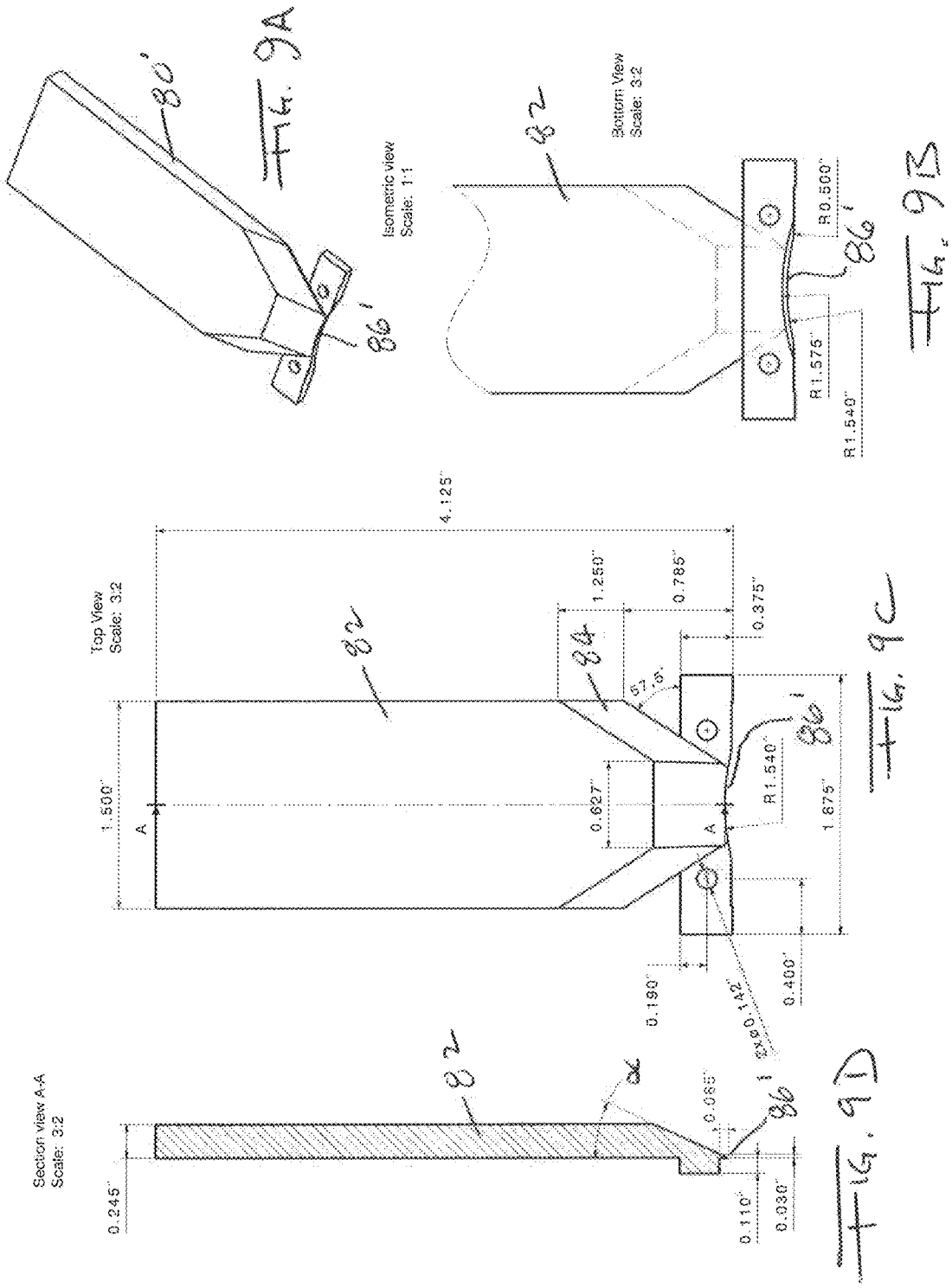

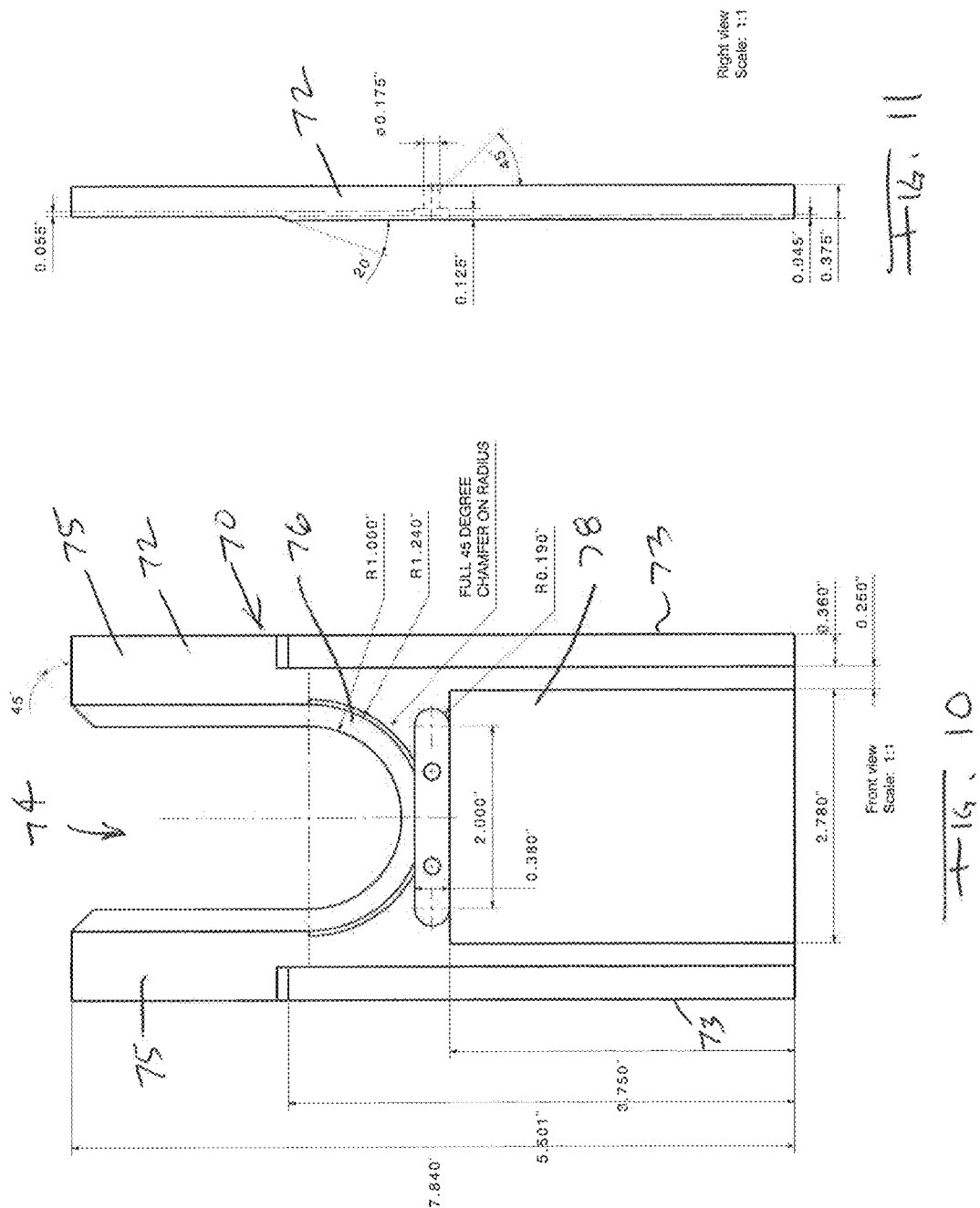

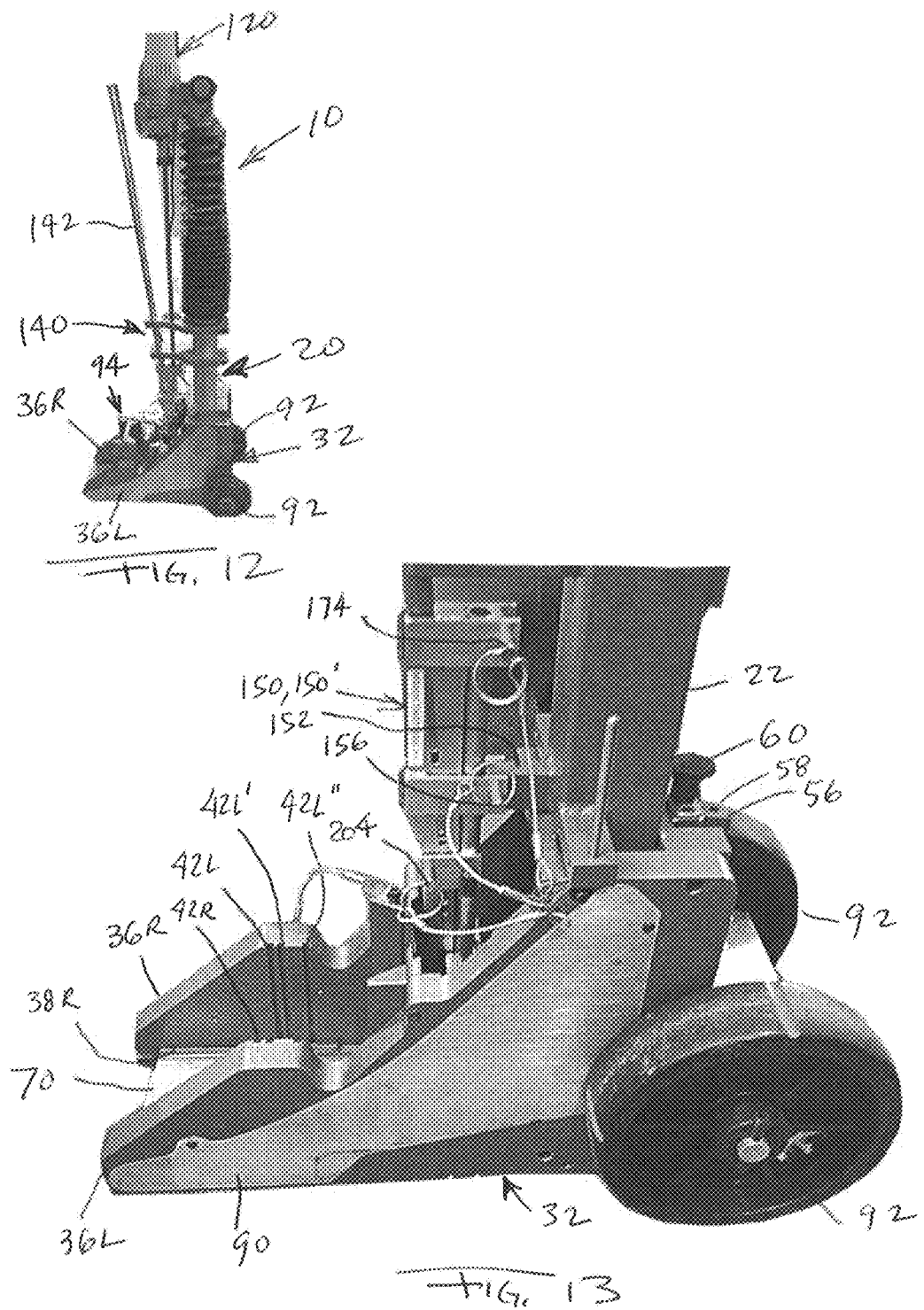

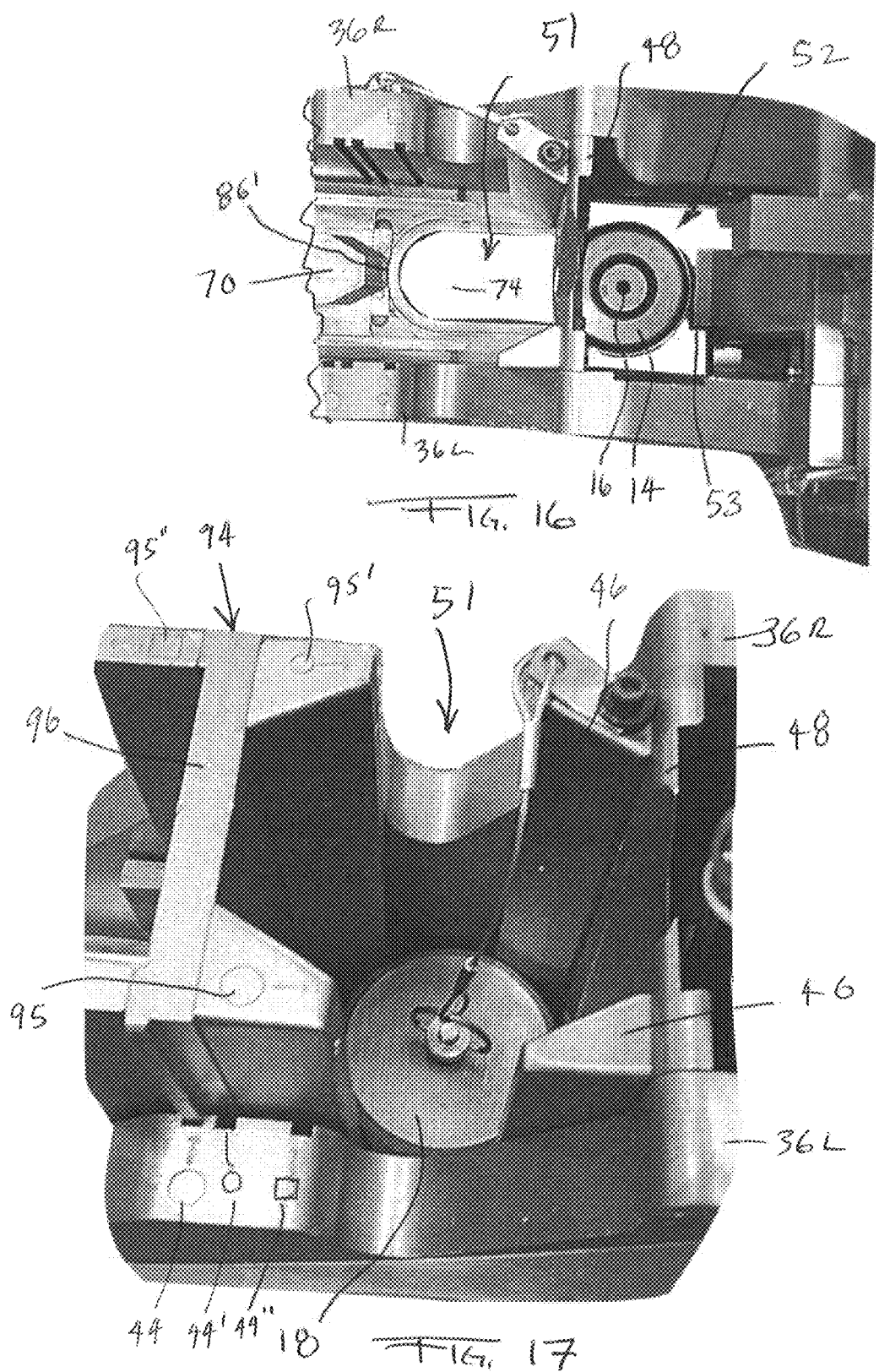

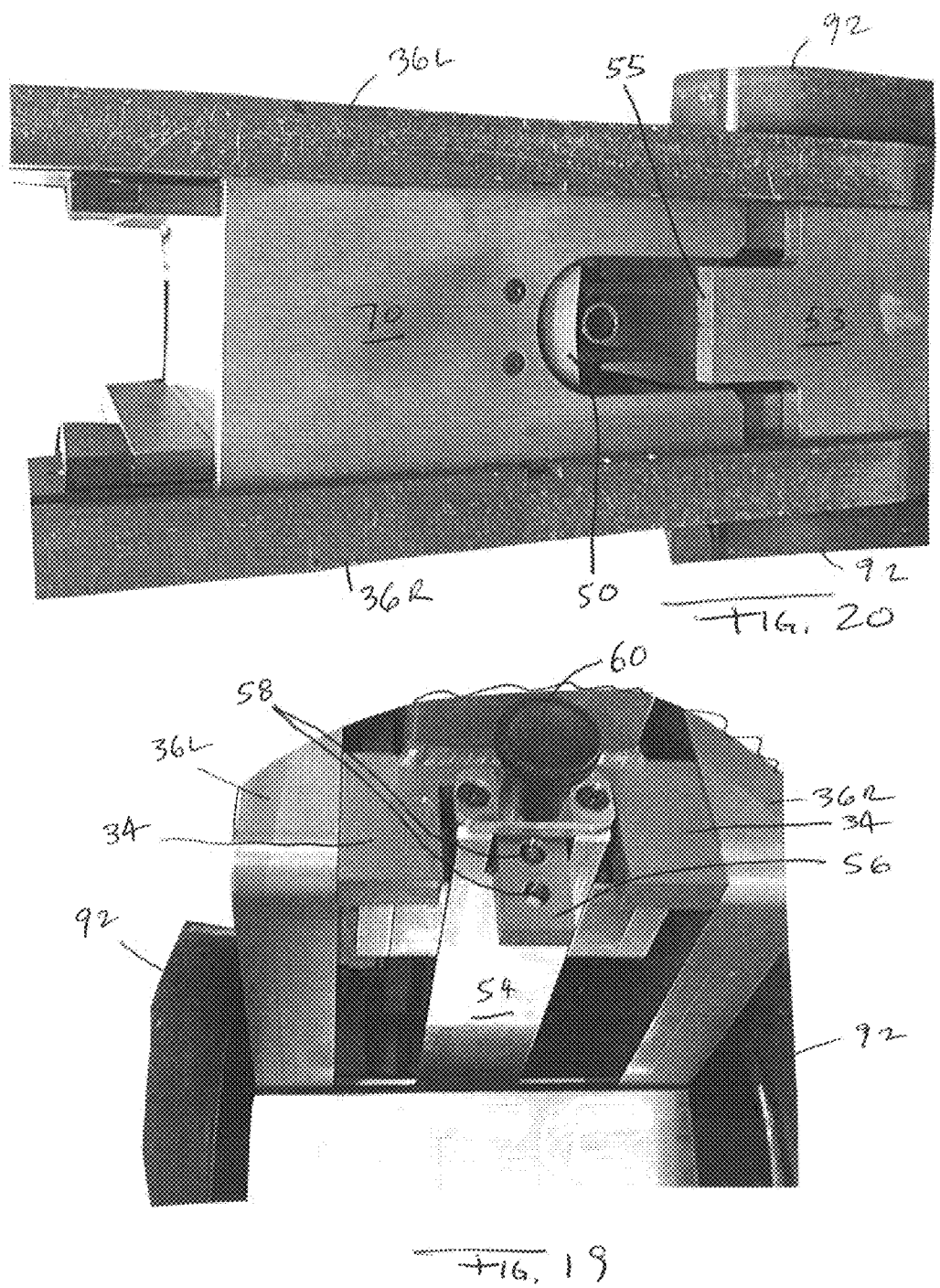

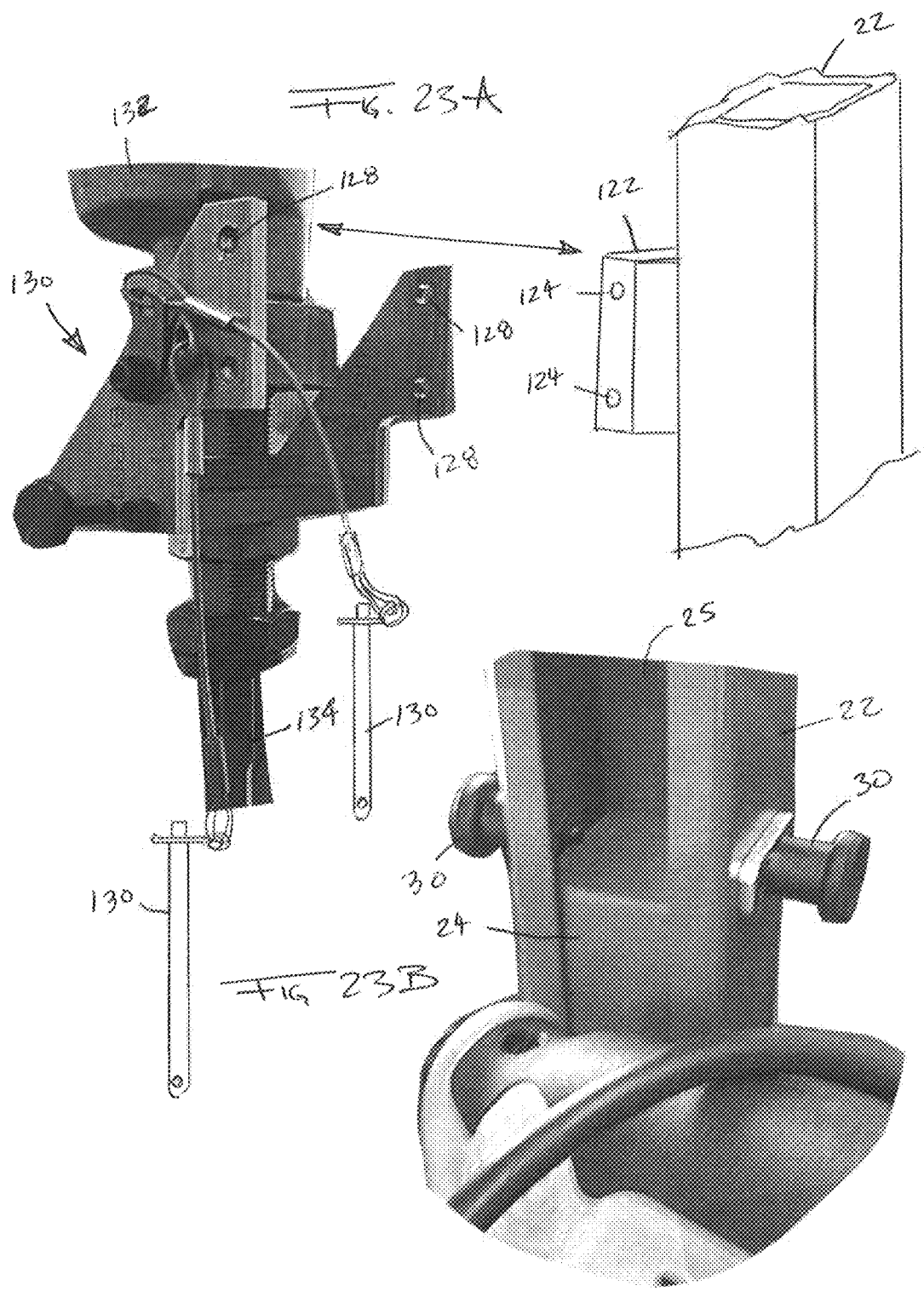

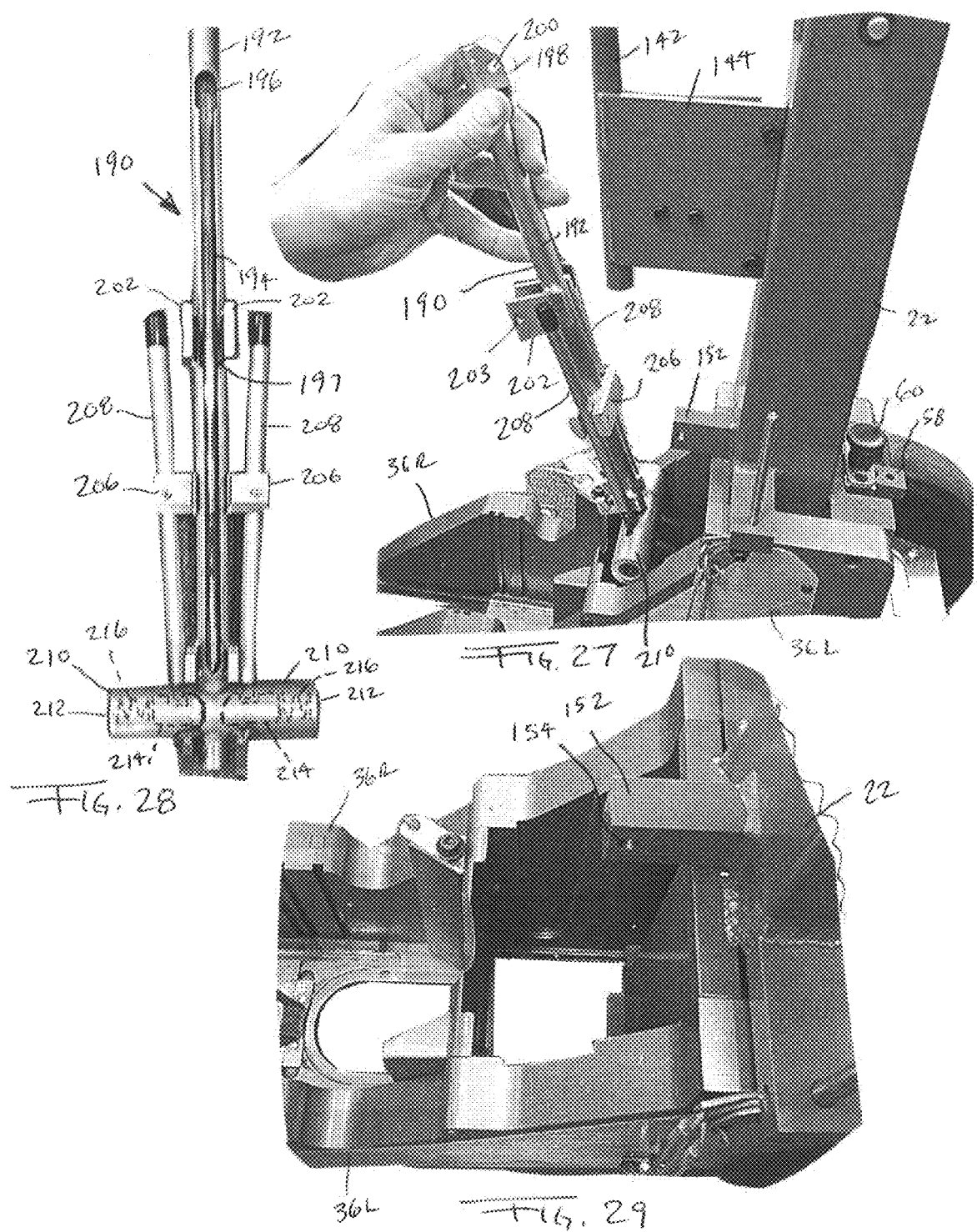

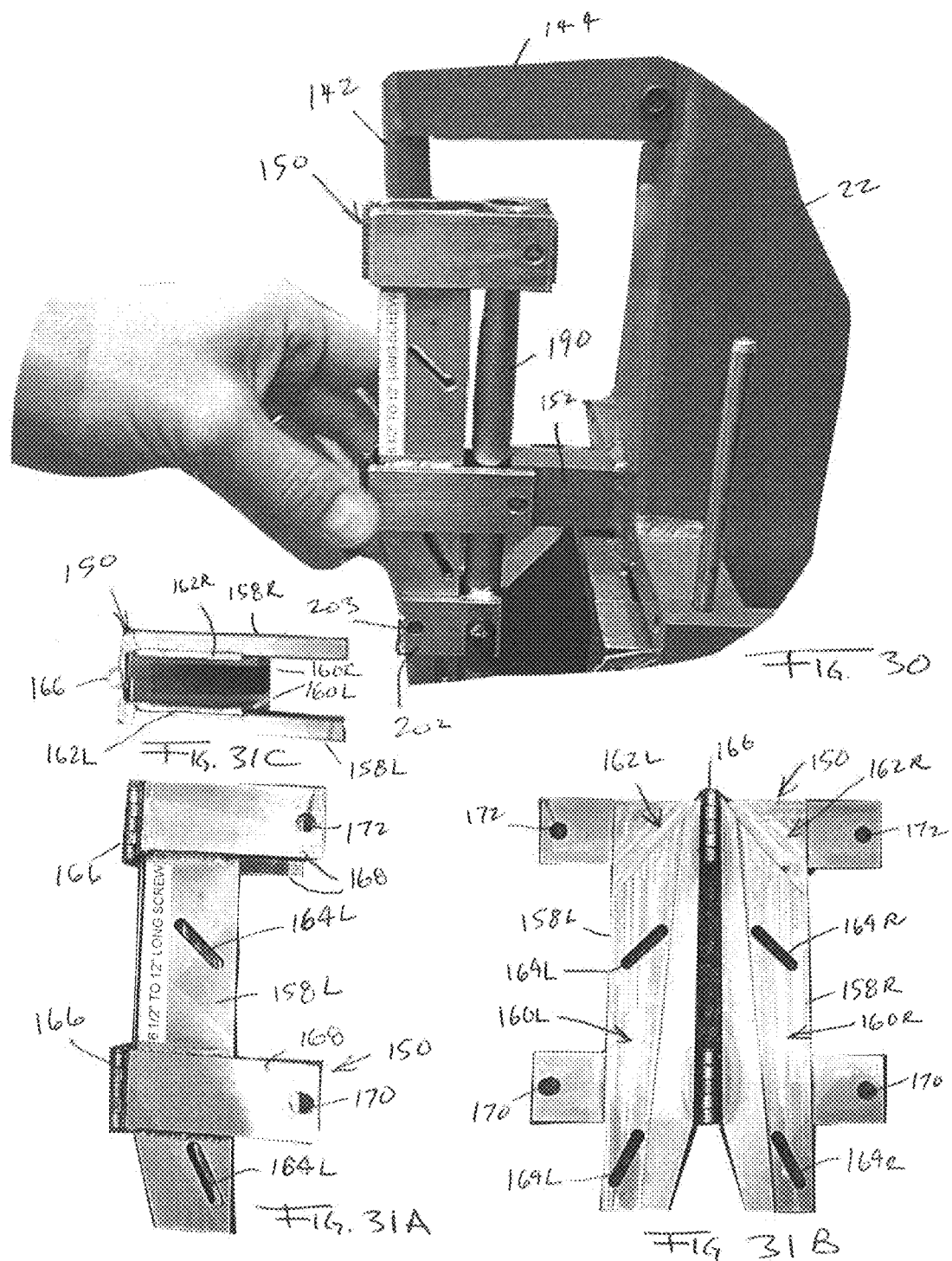

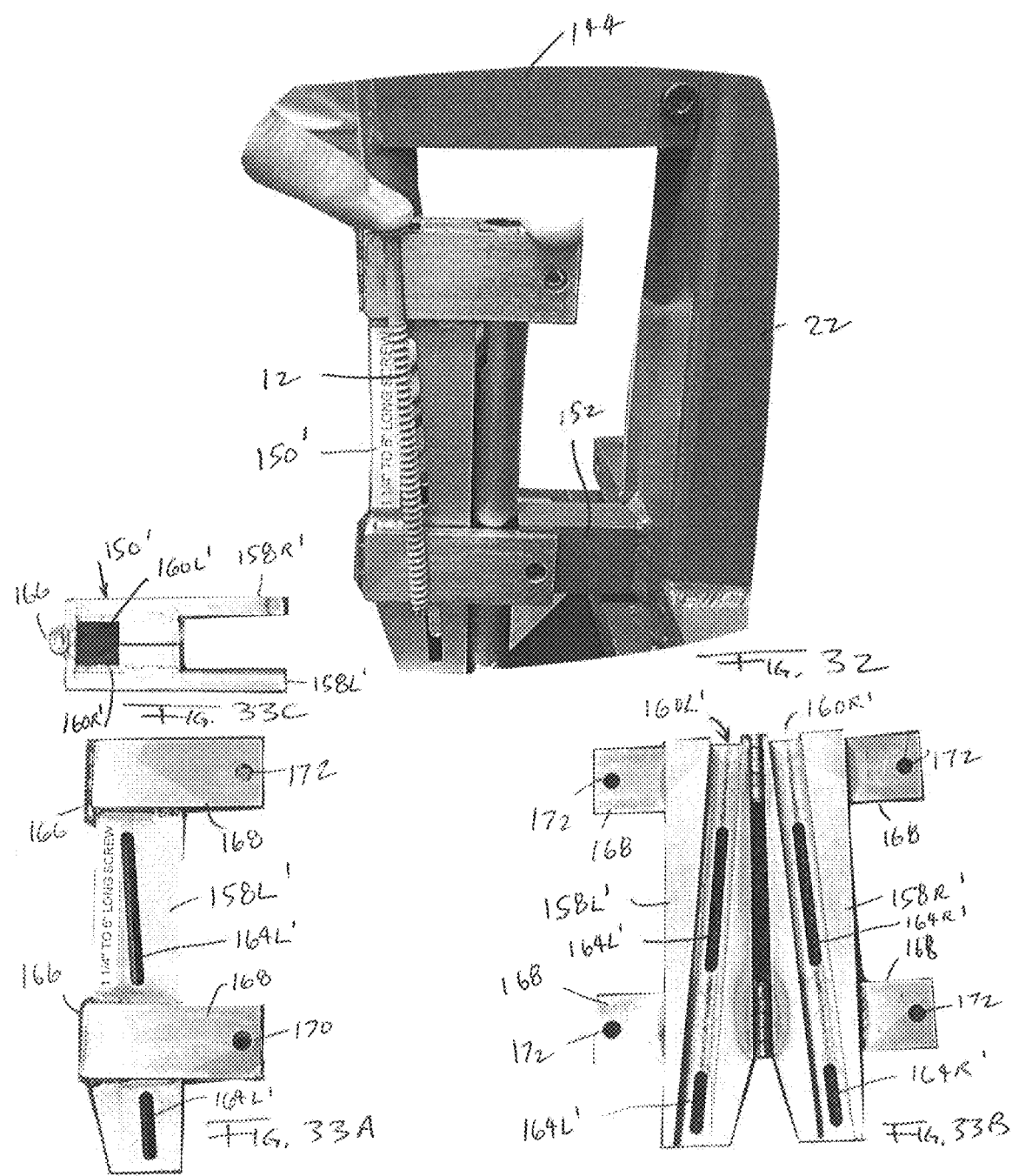

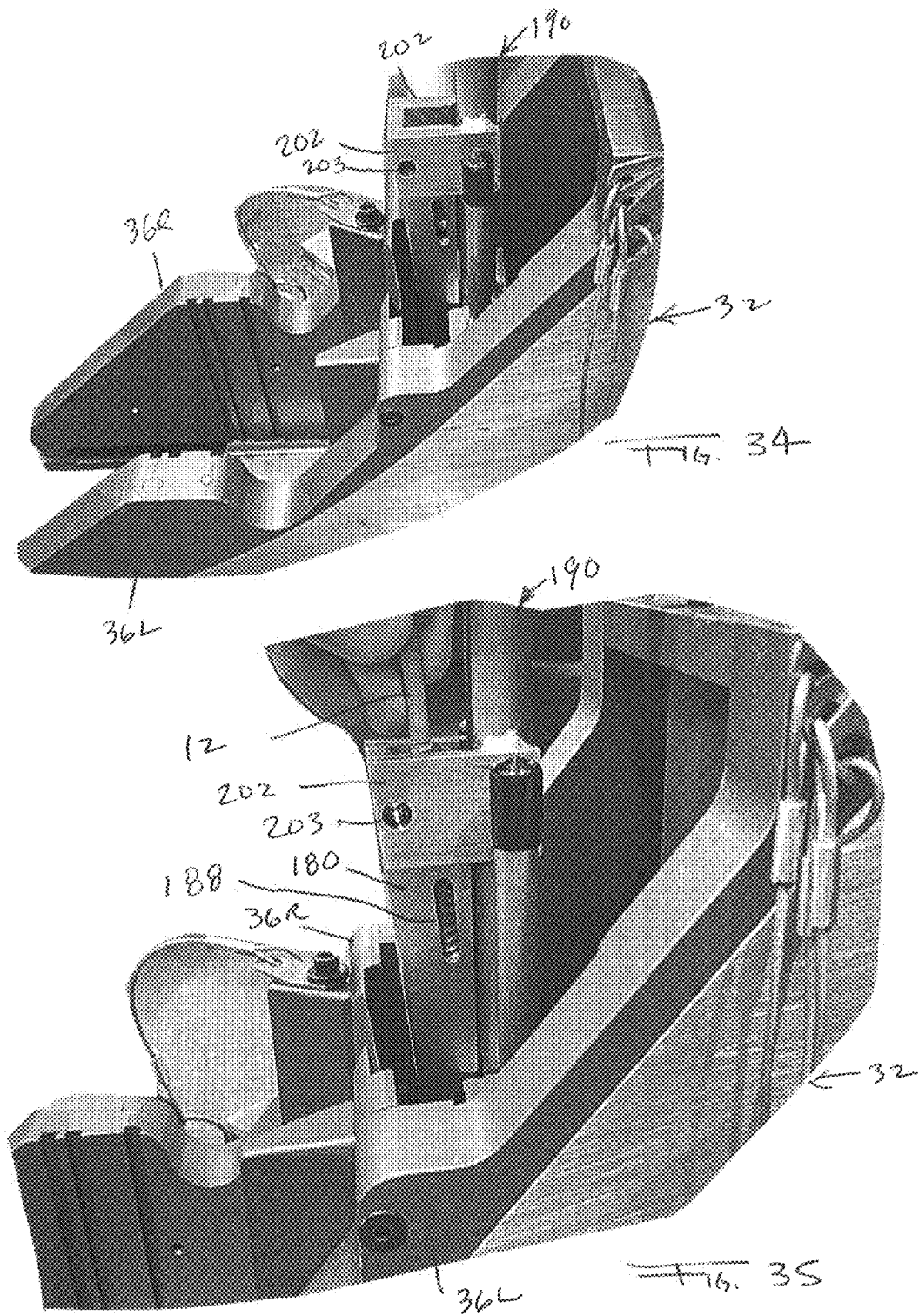

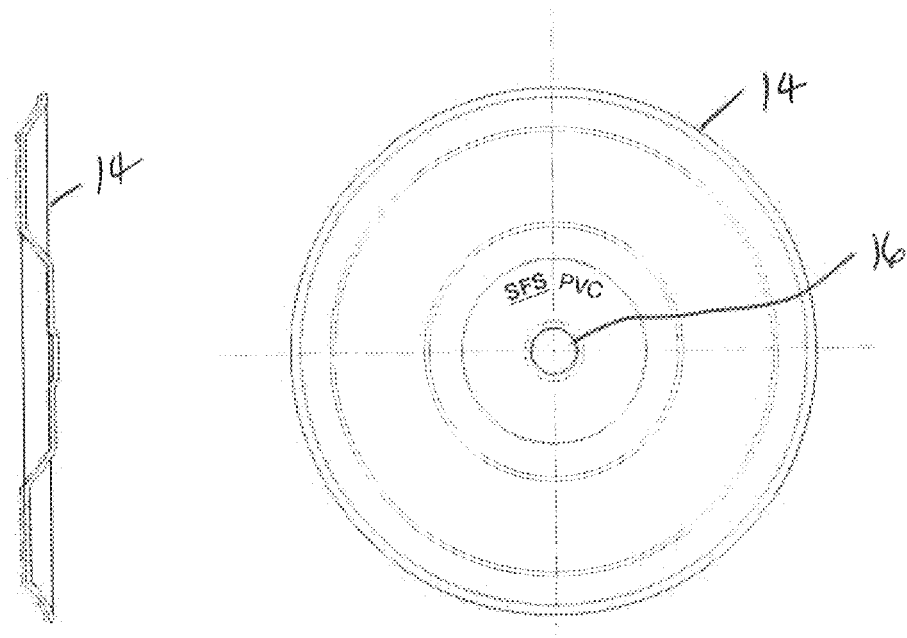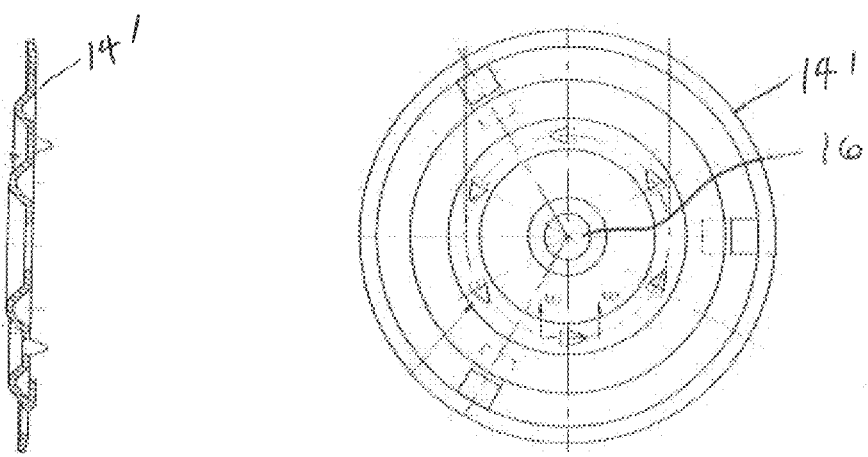

FASTENING TOOL FOR ROOFING FASTENERS WITH PLATE WASHERS

INCORPORATION BY REFERENCE

The following documents are incorporated herein by reference as if fully set forth: U.S. Provisional Application No. 62/347,169, filed Jun. 8, 2016.

FIELD OF THE INVENTION

The present invention is related to tools for installing threaded fasteners through a plate washer to secure a roofing membrane and/or insulation to a roof structure.

BACKGROUND

It would be desirable to have an easily serviceable installation tool that is adapted to receive threaded fasteners of different lengths, for example from 1 to 12 inches, and install them through different sizes and types of washers including washers with coated top surfaces in an efficient manner, that can be used in a simple and efficient manner on roofs and other structures.

SUMMARY

A fastener installation tool for installing threaded fasteners through a washer plate having a center hole is provided. The installation tool includes a frame having a base, a handle base tube connected to the base, a handle telescoping tube slidably movable in the handle base tube, a handle attached to the handle telescoping tube, and a spring that biases the handle telescoping tube away from the base. The base includes first and second sidewalls that are connected to the handle base tube, the sidewalls including inner facing sides. The inner facing sides each include: an opposing shuttle groove that extends generally horizontally in a use position of the installation tool along a bottom of the base, an opposing nose piece receiving groove that extends upwardly in the use position, and a plurality of opposing plate guide grooves that extend upwardly in the use position, and a medial wall located between the sidewalls. A removable washer plate guide wall assembly is provided having opposing sides that are slidably received in one pair of the opposing plate guide grooves to define a plate loading area for a stack of washer plates between the sidewalls and the medial wall. Depending on which pairs of grooves are utilized and the orientation of the removable washer plate guide wall assembly, different sized washers can be accommodated. A washer plate installation area is also located between the sidewalls between the medial wall and an adjustable plate stop adjustably connected to the base. A shuttle is provided having a base plate with two opposite edges that are received in the opposing shuttle grooves in the sidewalls for sliding movement of the shuttle between a loading position and a delivery position. The base plate further includes a slot facing the washer plate installation area. The slot defines two support arms for a bottom one of the washer plates in the stack in the loading position. A catch lip is located on the base plate in a medial portion that is adapted to catch a distal edge of the bottom most washer plate in the stack in the loading position so that as the shuttle returns to the delivery position it carries the bottom most washer plate in the stack beneath the medial wall to the delivery position in the washer plate installation area by the sliding movement thereof. A shuttle link is connected between the shuttle and the handle telescoping tube, such that a downward movement of the handle telescoping tube to an install position is transmitted by the shuttle link to cause the sliding movement of the shuttle to the loading position, and a return force generated by the spring to raise the handle telescoping tube to a ready position causes the sliding movement of the shuttle to the delivery position where the washer plate is adapted to contact the adjustable plate stop. A scraper on the medial wall prevents the washer plate from returning with the shuttle from the installation position upon the shuttle being again moved to the loading position. Wheels are connected to the base for ease of movement. A drive assembly including a drive motor and a drive shaft are connected to the handle telescoping tube. The drive shaft is aligned with a center of the washer plate installation area which is adapted to correspond with the center of the washer plate being installed. A screw feed arrangement is provided and includes an upper screw feed tube attached to the handle base tube and an upper screw feed guide located beneath the upper screw feed tube and connected to an upper screw feed attachment mount connected to the handle base tube. The upper screw feed guide includes a fastener guide groove. A lower screw feed guide is located below the upper screw feed guide and includes a fastener guide groove. A nose piece is located in the nose piece receiving grooves in the sidewalls. The nose piece includes a drive shaft tube having a head receiving slot connected to a shaft receiving slot in a sidewall thereof that are aligned with the fastener guide grooves so that upon insertion of the threaded fastener in the upper screw feed tube, the threaded fastener is adapted to be fed by gravity through the upper and lower screw feed guides into the drive shaft tube. Here, it is engaged by the drive shaft upon the downward movement of the handle telescoping tube and inserted through the center hole in the washer plate in the washer installation area as the drive shaft rotates to install the threaded fastener and the washer plate.

Other aspects of the installation tool along with methods for its use and disassembly for clearing jams are explained in detail below.

BRIEF DESCRIPTION OF THE DRAWINGS

The foregoing Summary as well as the following Detailed Description will be best understood when read in conjunction with the appended drawings which show a preferred embodiment of the invention. In the drawings:

FIG. 1 is an elevational view of a fastener installation tool in accordance with a first embodiment.

FIG. 2 is a top view of the installation tool shown in FIG. 1.

FIG. 3 is an elevational view of an outside of a base sidewall for the installation tool with the protective cover removed.

FIG. 4 is an inside elevational view of the base sidewall of FIG. 3.

FIG. 5 is an inside view of the base sidewall showing a kinematic movement of the handle telescoping tube and the shuttle link as well as a pivoting movement of the plate stop adjustment lever to adjust a position of the plate stop.

FIG. 6 is an enlarged detailed view of the shuttle.

FIG. 7 is an enlarged detailed view of a portion of the shuttle showing the catch lip.

FIGS. 8A-8D are detailed views of a blade with a straight catch lip that is connectable to the shuttle base plate.

FIGS. 9A-9D are detailed views of a blade with a curved catch lip that is connectable to the shuttle base plate.

FIGS. 10 and 11 are detailed views of the shuttle base plate.

FIG. 12 is an elevational view of the installation tool with a drive motor connected to the handle telescoping tube.

FIG. 13 is a perspective view of the base of the frame.

FIG. 16 is an enlarged top view showing a washer plate in the washer plate installation area and the shuttle in the washer plate loading area in a position to receive another washer plate.

FIG. 17 is an enlarged view showing a weight on top of a stack of washer plates in the plate loading area.

FIG. 19 is a perspective view of the back of the base showing the lever retainer for the plate stop adjustment lever.

FIG. 20 is a bottom view of the base showing the shuttle in the delivery position.

FIG. 23A is perspective view showing the motor with the motor clamp mount removed from the motor handle mount and the connection pins connected to lanyards on the motor clamp mount.

FIG. 23B is a perspective view showing locking pins connected to the handle base tube for locking the handle telescoping tube in a downward position corresponding to the install position.

FIG. 27 is a perspective view showing the removal of the nose piece from the base.

FIG. 28 is an elevational view of the nose piece.

FIG. 29 is a perspective view of the base showing the nose piece receiving grooves in the sidewalls with the nose piece removed.

FIG. 30 is an enlarged elevational view showing the installation of a first embodiment of the upper screw feed guide for longer screws to the frame.

FIG. 31A is a side elevational view of the first embodiment of the upper screw feed guide in a closed position.

FIG. 31B is an elevational view of the first embodiment of the upper screw feed guide shown in FIG. 31A in the hinged open position.

FIG. 31C is a top view of the first embodiment of the upper screw feed guide of FIG. 31A in the closed position.

FIG. 32 is an enlarged elevational view showing the installation of a second embodiment of the upper screw feed guide for shorter screws to the frame.

FIG. 33A is a side elevational view of the second embodiment of the upper screw feed guide in the closed position.

FIG. 33B is a top view of the second embodiment of the upper screw feed guide in the hinged open position.

FIG. 33C is a top view of the second embodiment of the upper screw feed guide of FIG. 33A in the closed position.

FIG. 34 is an enlarged view showing the lower screw feed guide installed in the nose piece.

FIG. 35 is a view similar to FIG. 34 showing a screw in position being fed through the lower screw feed guide.

FIGS. 36 and 37 are views of a first embodiment of a washer plate.

FIGS. 38 and 39 are views of a second embodiment of a washer plate having downwardly projecting spikes.

DETAILED DESCRIPTION OF THE PREFERRED EMBODIMENTS

Figure 14:
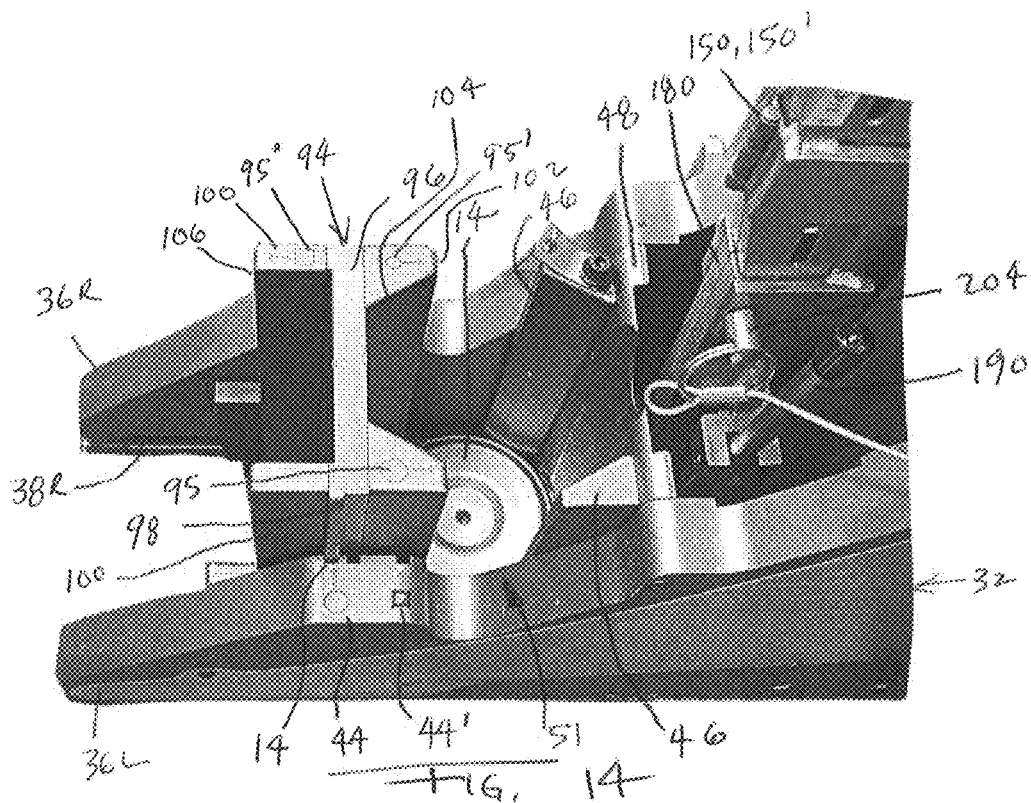
FIG. 14 is an enlarged perspective view of the base of the frame showing the washer plate loading area and the washer plate installation area.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. These terms and terms of similar import are for ease of description when referring to the drawings and should not be considered limiting. "Axially" refers to a direction along the axis of a shaft or similar object. A reference to a list of items that are cited as "at least one of a, b, or c" (where a, b, and c represent the items being listed) means any single one of the items a, b, or c, or combinations thereof.

For elements of the invention that are identical or have identical actions, identical reference symbols are used. The illustrated embodiments represent merely examples for how the device according to the invention could be equipped. They do not represent a conclusive limitation of the invention.

Figures 40, 41:
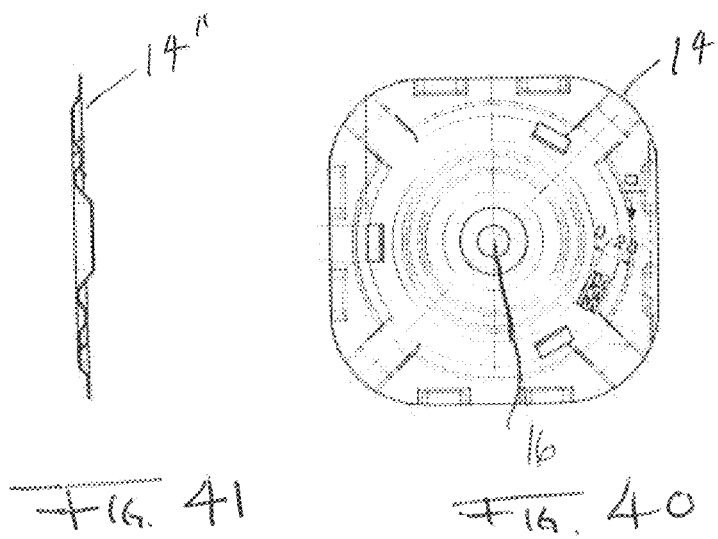
FIGS. 40 and 41 are views of a third embodiment of a washer plate having a generally square configuration.
Figure 42:
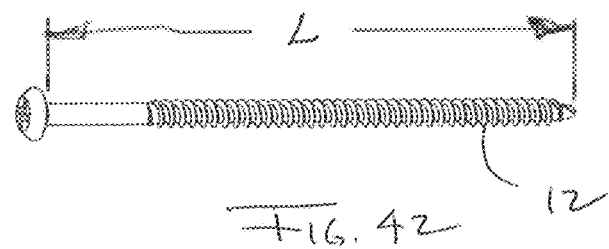
FIG. 42 is a view of a representative threaded fastener used in connection with the installation tool.
Figure 44:
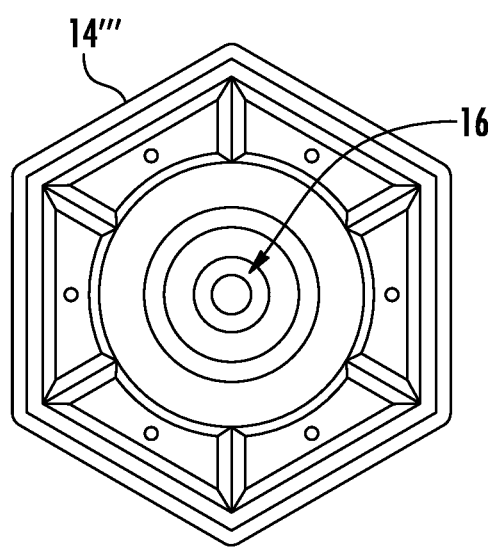
FIG. 44 is a view of a fourth embodiment of a washer plate used in connection with the installation tool.

Referring to FIGS. 1-35, a fastener installation tool 10 for installing threaded fasteners 12, shown in detail in FIG. 42, through a washer plate, such as washer plate 14 shown in FIGS. 36 and 37, washer plate 14' shown in FIGS. 38 and 39, a washer plate 14" shown in FIGS. 40 and 41, or a washer plate 14''' shown in FIG. 44. The washer plates 14, 14', 14", 14''' all have a center hole 16 through which the threaded fastener 12 is to be installed. The threaded fasteners have a length L indicated in FIG. 42 which can be from 1"-12" for most applications, and the threaded fasteners 12 are installed through the washer plates 14, 14', 14", 14''' in connection with applying a roofing membrane or roofing materials onto a substrate.

Referring to FIGS. 1, 2, and 12-20, the fastener installation tool 10 includes a frame 20. The frame 20 has a base 32 and a handle base tube 22 connected to the base 32. A handle telescoping tube 24 is slidably moveable in the handle base tube 22. As shown in cross-section in FIG. 2, the handle base tube 22 preferably has a generally square cross-section and the handle telescoping tube 24 also has a generally square cross-section that is adapted for sliding movement within the handle base tube 22. Slots 25 are provided in the handle base tube 22 in order to allow for up and down movement of the handle telescoping tube 24 along with the elements attached thereto, including the handle cross-member 26. The handle base tube 22 and the handle telescoping tube 24 may also have a round cross-section, for example in the embodiment of the fastener installation tool 10 shown in FIG. 12.

Figure 23C:
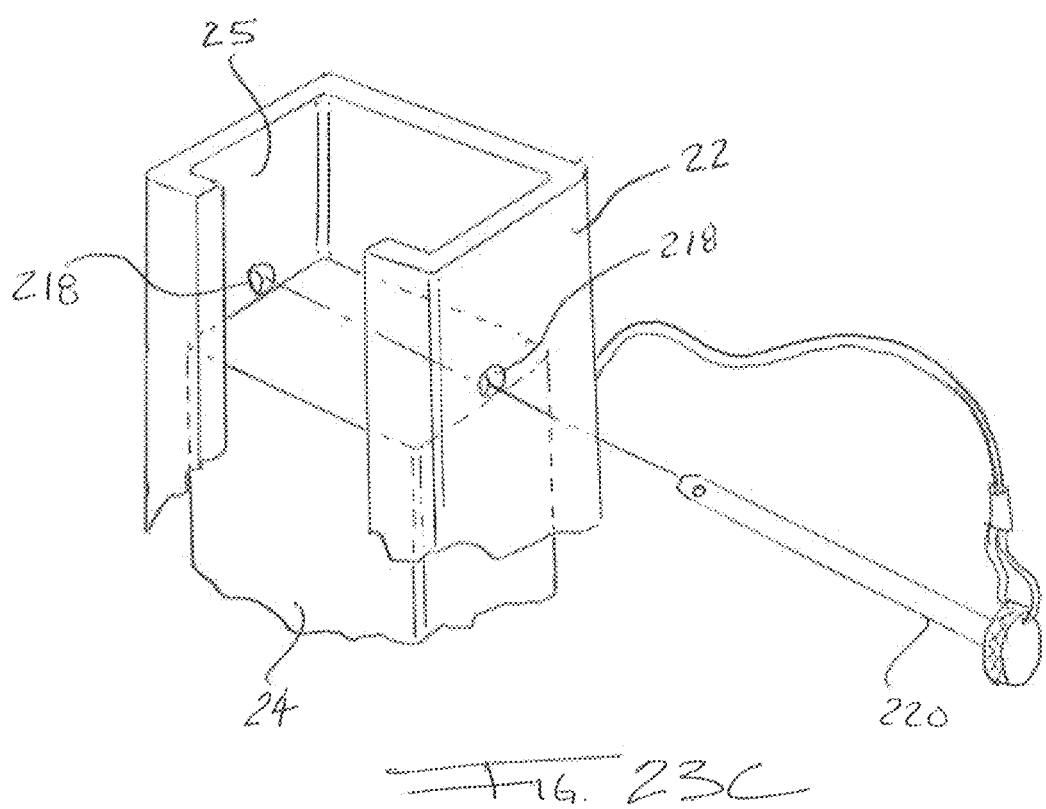
FIG. 23C is a perspective view, partially broken away, of a locking pin similar to FIG. 22B that locks the handle telescoping tube in a downward position corresponding to the install position.
Figure 24:
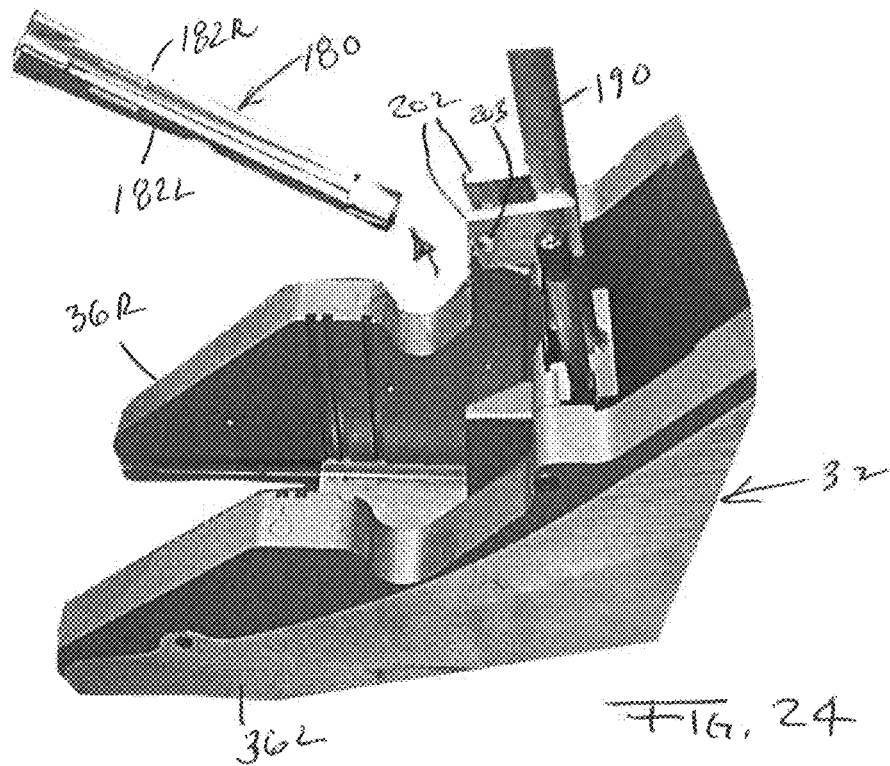
FIG. 24 is an enlarged view of the base showing the removal of the lower screw feed guide from the nose piece.

As shown in broken lines in FIG. 1, a spring 28 is located within the handle base tube 22 and rests in the base 32 and biases the handle telescoping tube 24 away from the base 32. Locking pins 30 are located on each side of the handle base tube 22, as shown in detail in FIG. 23B and can be used to hold the handle telescoping tube 24 in a lowered position for movement and/or servicing of the fastener installation tool 10. As shown in FIG. 23B, these pins extend over a top of the handle telescoping tube 24 to prevent it from being returned by the spring force of the spring 28 to an upper position. Alternately, as shown in FIG. 23C, which shows a portion of the base tube 22 with the handle telescoping tube 24 in the lowered position similar to FIG. 23B, the handle telescoping tube 24 can be locked in a lowered position by at least one pin 220 inserted through aligned holes 218 in the base tube 22.

Referring to FIGS. 1-5 and 13-20, the base 32 includes first and second side walls 36L, 36R which are generally mirror-images of one another. FIGS. 3 and 4 show the sidewall 36L in detail, with the sidewall 36R being a mirror image thereof. The sidewalls 36L, 36R are connected to the handle base tube 22 via spacers 34. The spacers 34 may be welded or otherwise connected to the handle base tube 22 and the side walls 36L, 36R connected via fasteners, adhesive, welds, etc. to the spacers 34. Alternatively, the sidewalls 36L, 36R and the spacers 34 may be integrated as a single piece, such as a casting, molding, or machined part, and be made of a single homogenous material. Depending upon the relative size of the handle base tube 22 and the side walls 36L, 36R and the required spacing, it may also be possible to mount the sidewalls 36L, 36R directly to the handle base tube 22. The sidewalls 36L, 36R include inner facing sides 37L, 37R which each include an opposing shuttle groove 38L, 38R that extends generally horizontally in a use position of the installation 10 along a bottom of the base 32. Opposing nose piece receiving grooves 40L, 40R that extend generally upwardly in the use position are also provided. These grooves 40L, 40R taper open as they extend upwardly to facilitate installation and removal of the nose piece 190 which will be described in further detail below. A plurality of opposing plate guide grooves 42L, 42R; 42L', 42R'; 42L", 42R" are also provided and extend generally vertically.

A medial wall 48 shown in detail n FIGS. 14-17 extends between the sidewalls 36L, 36R. The medial wall 48 includes a spring-loaded gate 50A, shown in FIG. 43, to which attached is a flexible scraper 50, best seen in FIGS. 20 and 43, on a bottom thereof. As shown in detail in FIGS. 14 and 15, preferably the tops of the sidewalls are marked with plate guide groove markings 44, 44', 44" which allow a user to easily position a removable plate washer guide assembly 94, shown in FIGS. 1 and 14, in a proper position to guide the washer plates 14, 14', 14", 14''' having different sizes or shapes.

Figure 15:
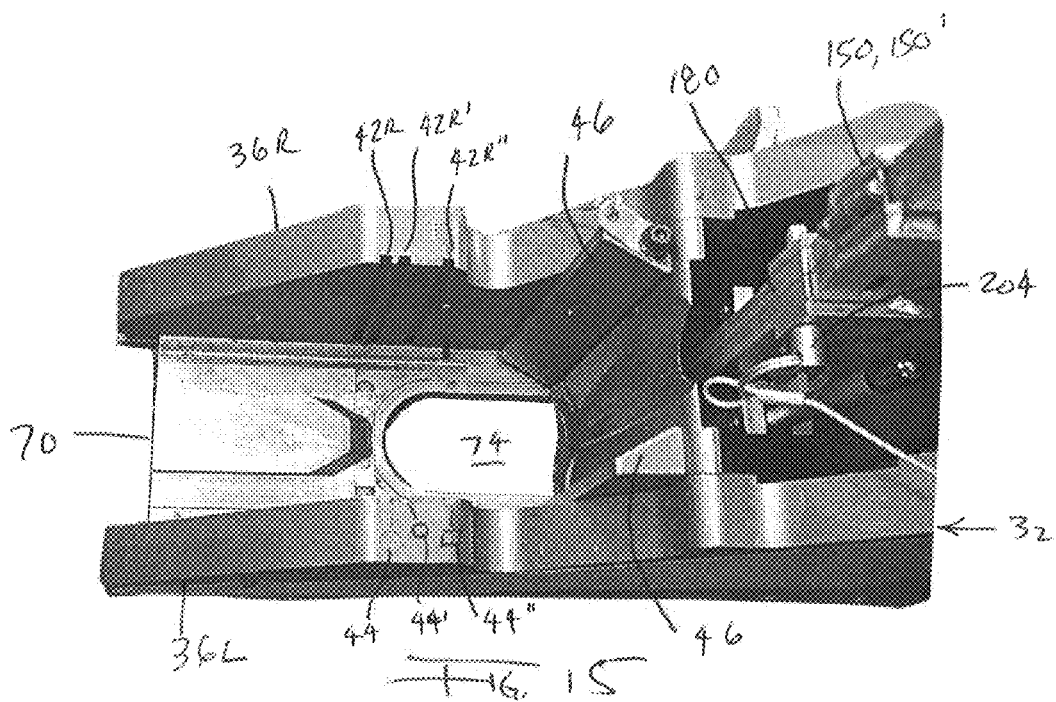
FIG. 15 is an enlarged perspective view showing the base with the removable washer plate guide wall assembly removed.
Figure 18:
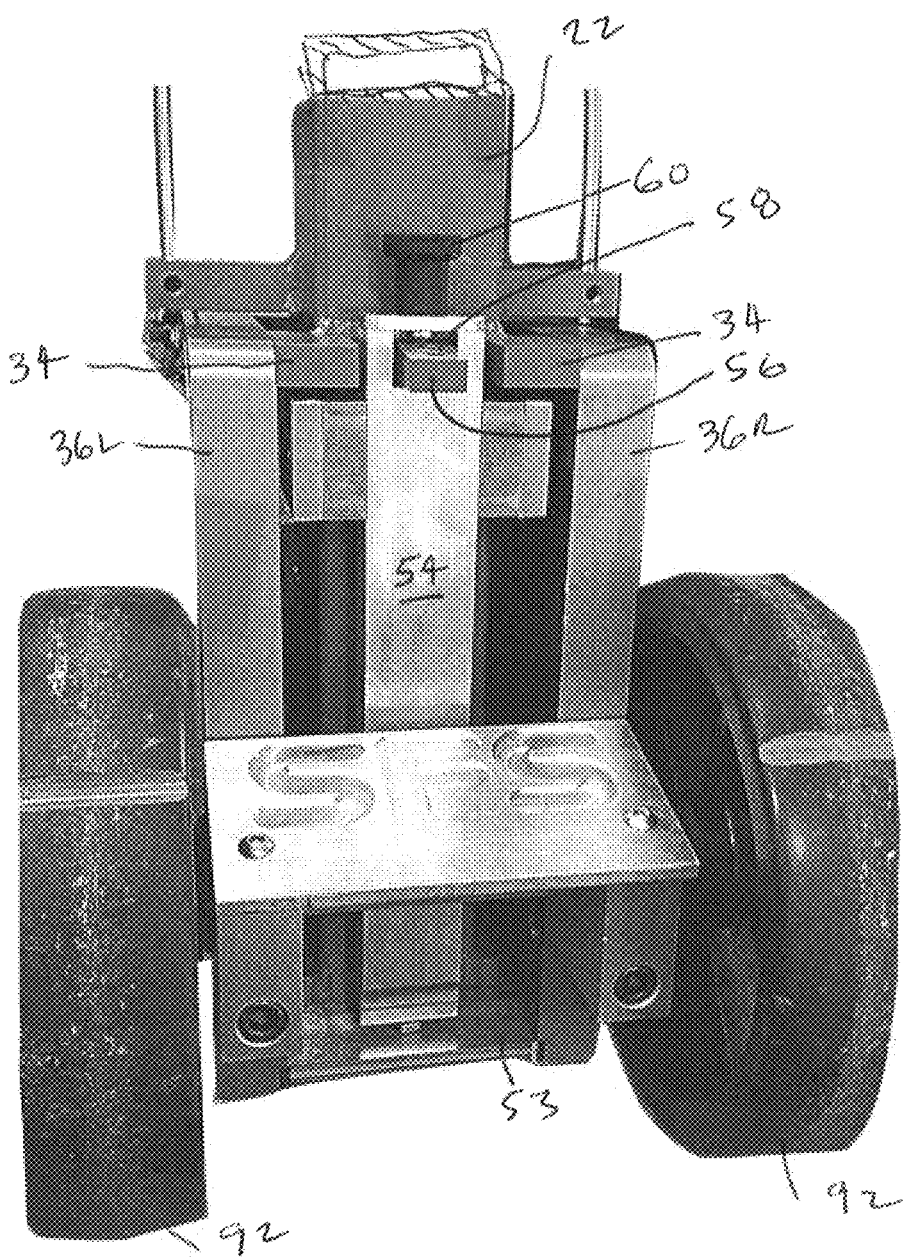
FIG. 18 is a back view of the base showing the plate stop adjustment lever.

The removable washer plate guide assembly 94, shown in FIGS. 1 and 14, has a generally H-shaped configuration, and includes a center support 96 and side walls 100. Guide projections 98 are located on the sides of the washer plate guide assembly 94 and are slideably received in one pair of the opposing plate guide grooves 42L, 42R; 42L', 42R'; 42L", 42R" to define a washer plate loading area 51 for a stack of washer plates 14 between the side walls, 36L, 36R and the medial wall 48. The side walls 100 that form the sides of the H-shape have first ends 102 and second ends 106. On the inside of the sidewalls 100 adjacent to the center support 96 on the first ends 102, tapered inner supports 104 are provided which are adapted to receive and guide generally circular or hexagonal washer plates 14, 14', 14'''. For the installation of generally square washer plates, such as washer plate 14", the removable washer guide assembly 94 can be lifted upwardly from the opposing plate guide grooves 42L, 42R and rotated 180° so that the second ends 106 face toward the handle base tube 22 and the removable washer plate guide assembly 94 can then be reinserted with the guide projections 98 received in the plate guide grooves 42L", 42R" so that it is adapted to define a washer plate loading area 51 that is specifically configured for the square washer plates 14". Guide markings 95, 95', 95" can also be provided on the washer plate guide assembly 94 for ease of reference for assembly. As shown in FIGS. 14 and 15, tapered plate guides 46 can also be mounted to the medial wall 48 for use in connection with round plates 14, 14'.

A washer plate installation area 52 is defined between the medial wall 48 and adjustable plate stop 53 that is connected to the base 32. The adjustable plate stop 53 is indicated schematically in FIG. 5 and shown in detail in FIGS. 18-20. The adjustable plate stop 53 is slidable in grooves 43L, 43R in the sidewalls 36L, 36R and is connected to a plate stop adjustment lever 54 that is pivotably mounted to the base 32. The position of the stop face 55 can be changed by releasing the plate stop adjustment lever 54 from a lever retainer 56 having a plurality of fixed positions defined by holes 58 corresponding to the required position of the stop face 55 for different sized washer plates 14, 14', 14", 14'''. The lever retainer 56 is connected to the plate stop adjustment lever 54 by a releasable pin 60 that can be removed and released without the need for any tools.

Referring now to FIGS. 5-11, 15, 16, and 20, a shuttle 70 is located in the base 32. The shuttle 70 includes a base plate 72 with two opposite edges 73 that are received in the opposing shuttle grooves 38L, 38R in the sidewalls 36L, 36R. This allows for sliding movement of the shuttle 70 between a loading position, shown in FIGS. 15 and 16, and a delivery position shown in FIGS. 14 and 20. The shuttle 70 is slidably moveable beneath the medial wall 48. The base plate 72 includes a slot 74 facing the washer plate installation area 52. The slot 74 defines two support arms 75 for a bottom one of the washer plates 12 in the stack in the loading position, for example as shown in FIG. 14. The base plate 72 further includes a plate washer recess 76 defined in the top of the base plate 72 in an area of the slot 74, which is adapted to receive and support the plates 14, 14', 14", 14''' slightly recessed from a top surface of the base plate 72. Preferably, a blade recess 78, shown in detail in FIGS. 10 and 11 is located on an upper surface of the base plate 72. A blade 80, 80', shown in detail in FIGS. 8A-8D or 9A-9D is located in the blade recess 78. The blade 80 includes a blade body 82 along with a tapered nose 84 which ends in a catch lip 86, 86', shown in detail in FIGS. 7 and 8D. The tapered nose of the blade 80, 80' preferably has a taper angle $\alpha$ of about 20 to 50 degrees from the horizontal, as shown in FIGS. 8D and 9D. One benefit that can be provided by invention is the lifting of the stack of plates 14, 14', 14", 14''' when feeding the bottom plate 14, 14', 14", 14''', which is accomplished by the blade body 82 with the catch lip 86, 86' as well as the tapered section with the taper angle $\alpha$, which creates lift.

This allows for feeding of coated plates 14, 14', 14", 14''' without scratching the top surface of the plate 14, 14', 14", 14''' being fed, creates separation when feeding plates 14, 14', 14", 14''' with barbs that can make the plates 14, 14', 14", 14''' become nested and difficult to feed, and makes it possible to feed plates 14, 14', 14", 14''' that otherwise may tend to nest due to geometry and be difficult to feed.

The blade 80 shown in FIGS. 8A-8D includes a straight catch lip 86, which is adapted for use in connection with a generally square washer plate 14". This is interchangeable with a second embodiment of the blade 80' shown in FIGS. 9A-9D having a curved catch lip 86' which is adapted for use in connection with generally circular washer plates, such as the washer plates 14, 14', 14'''. Fastener holes for connecting the blade 80, 80' to the base plate 72 are also provided to allow the blades 80, 80' to be interchanged. Alternatively, the connection between the blade 80, 80' and the base plate 72 could be by other methods, such as a releasable fastener or a form fit, or could be glued or welded. Alternatively, the blade could be formed integrally with the base plate 72. The catch lip 86, 86' is located in a medial portion of the shuttle 70 and is adapted to catch a distal edge of the bottom most washer plate 14, 14', 14", 14''' in the stack when the shuttle 70 is in the loading position, as shown in FIGS. 15 and 16. Movement of the shuttle 70, which is described in further detail below, carries the bottom most washer plate 14 in the stack beneath the medial wall 48 to the delivery position in the washer plate installation area 52, as illustrated in FIG. 16.

Referring again to FIGS. 1 and 5, a shuttle link 88 is connected between the shuttle 70 and the handle telescoping tube 24. A downward movement of the handle telescoping tube 24 results in the shuttle link 88 being driven downwardly and pivoting sideways, as indicated in FIG. 5, as the handle telescoping tube 24 moves down toward the install position in order to cause a sliding movement of the shuttle 70 to the loading position, as illustrated schematically in FIG. 5, where the shuttle link indicated as 88' shows the install position. Preferably, shuttle links 88 are connected to both sides of the handle telescoping tube 24 and are located in recesses in each of the sidewalls 36L, 36R, which are covered by cover plates 90, as shown in FIG. 13. The spring 28 generates a return force on the handle telescoping tube 24 to raise the handle telescoping tube 24 back to a ready position which results in a sliding movement of the shuttle 70 to the washer plate delivery position, shown in FIG. 14, where the washer plate 14 is adapted to contact the stop face 55 of the adjustable stop plate 53. The washer plate 14 contacting the adjustable stop plate 53 is shown in FIG. 16; however, here the shuttle 70 is shown again in the loading position after having delivered a plate washer 14 to the delivering position.

Figure 43:
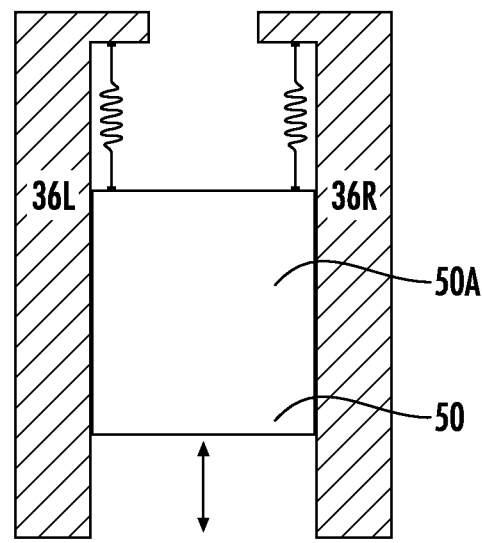
FIG. 43 is an alternate configuration of a scraper.

Referring to FIGS. 20 and 43, a spring gate assembly 50A containing a scraper 50 at the bottom of the gate is shown at the bottom of the medial wall 48 to prevent a return of a washer plate 14 from the installation position in the plate installation area 52 upon the shuttle 70 being moved to the loading position to receive another washer plate 14 from the washer plate loading area 51. The scraper 50 can be a flexible material that deflects upwardly as a washer plate 14 is delivered to the washer plate installation area 52 without scratching the top surface of the washer plate, but catches a portion of the washer plate 14 as the shuttle 70 returns to the loading position in order to prevent its return along with the shuttle 70 to the washer plate loading area 51. Alternatively, as shown in FIG. 43. The scraper 50A can be a spring-loaded plate mounted between the sidewalls 36L, 36R.

As shown in FIGS. 1, 12, and 13, wheels 92 are preferably connected to the base 32. These allow the installation tool 10 to be rolled along a surface.

Referring to FIGS. 1, 12, and 23A, a drive assembly 120 is connected to the handle telescoping tube 24. The drive assembly 120 includes a drive motor 132 that is connected to a drive shaft 134. The drive shaft 134 is aligned with a center of the washer plate installation area 52 which is adapted to correspond with the center of the washer plate 14, 14', 14", 14''' that is being installed once it contacts the plate stop 53. As shown in FIGS. 1, 2, and 23A, a motor handle mount 122 is connected to the handle telescoping tube 24 and extends through a slot 25 through one side of the handle base tube 22. Pin openings 124 are located in the motor handle mount 122. A corresponding motor clamp mount 126 is provided to which the motor 132, which can be in the form of a commercially available drill or powered screwdriver, can be mounted. This also provided with pin openings 128. Connection pins 130, shown in FIG. 23A in the uninstalled position, are insertable through the pin openings 128 in the motor clamp mount 126 and the pin openings 124 in the motor handle mount 122 in order to mount the motor 132 to the handle telescoping tube 24. The motor clamp mount 126 may include a collar for clamping onto the motor 132 or other known connector arrangements. The drive shaft 134 is connected to the motor 132, for example, using a chuck or other positive drive connection.

As shown in FIGS. 1 and 12, a screw feed arrangement 140 is connected to the frame 20. The screw feed arrangement 140 includes an upper screw feed tube 142 preferably connected to the handle base tube 22 via a tube mount 144, shown in FIGS. 1, 22, and 27. Alternatively, upper and lower tube mounts 144, 146 can be provided as shown in connection with the embodiment of the installation tool shown in FIG. 12. The feed tube 142 has a greater inside diameter than a head of a threaded fastener 12 to be installed and generally extends from an area within easy reach for a user to insert a fastener as shown in FIG. 1.

Figures 21, 22:
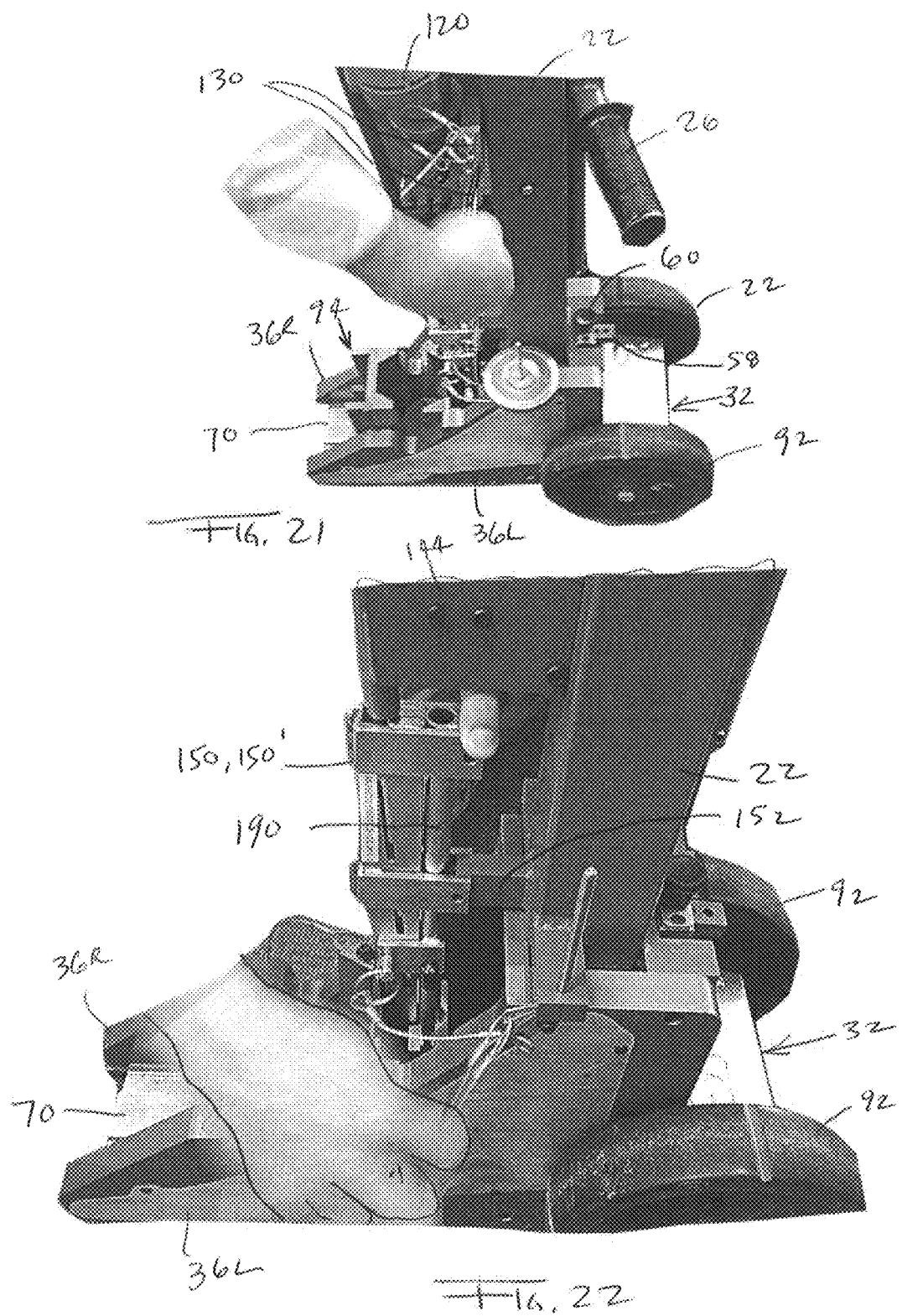
FIG. 21 is a top left perspective view showing removal of connection pins holding the drive assembly to the motor handle mount.
FIG. 22 is a perspective view showing removal of connection pins holding the upper screw feed guide to the nose piece and to the attachment mounting post on the frame.

An upper screw feed guide 150 is located beneath the upper screw feed tube 142, as shown in FIG. 1 and in an enlarged detail in FIG. 22. The upper screw feed guide 150 is connected to an upper screw feed attachment mount 152, shown in FIGS. 1 and 22, that is connected to the handle base tube 22. The upper screw feed guide 150 is preferably formed from grooved plates 158L, 158R, shown in detail in FIGS. 31A-31C, which define a fastener guide groove, formed by groove halves 160L, 160R shown in FIGS. 31B and 31C. Depending on the length L of the threaded fastener 12 to be installed, there can also be a separate head guide groove 162L, 162R also formed in the grooved plates 158L, 158R shown in FIGS. 31B and 31C when they are in a closed position. The head guide groove 162L, 162R would be used in connection with longer screws so that they are directed into the nose piece 190 at a higher position, as described below. The grooved plates 158L, 158R are preferably connected together via hinges 166 connected to mounting plates 168 affixed to the grooved plates 158L, 158R. The mounting plates 168 having mounting holes 170, 172 defined therein. Preferably, at least one inspection window 164L, 164R is provided in each of the grooved plates 158L, 158R. The mounting holes 170 located through the mounting plates 168 are alignable with a mounting opening 154 in the upper screw feed attachment mount 152 on the frame 20, and a removable connection pin 156 is located through the mounting holes 170 and the mounting opening 154 in order to secure the upper screw feed guide 150 to the frame 20.

Preferably, at least two of the upper screw feed guides 150, 150' are provided having different configurations of the fastener guide groove 160L, 160R, 160L', 160R'. The second embodiment of the upper screw feed guide 150' is shown in FIG. 32 in the installation position on the frame 20 as well as in detail in FIGS. 33A-33C. Here the fastener guide groove 160L', 160R' in the grooved plates 158L', 158R' for the upper screw feed guide 150' is configured for shorter screw lengths. Here, the groove 160L', 160R' is adapted to allow the threaded fastener head to slide through along with the threaded shaft. The inspection windows 164L' and 164R' are also provided. The shaft head guide groove that is used in the case of shorter threaded fasteners 12 is in the lower screw feed guide 180, described below. This can be seen from a comparison of FIGS. 31B and 33C where, for longer screws, the head guide groove formed by the half grooves 162L, 162R are located in the grooved plates 158L, 158R, while for shorter screws, no head guide groove is provided in the grooved plates 158L', 158R' and only the fastener guide groove 160L', 160R' that is sized to accommodate the head is formed.

The upper screw feed guides 150, 150' are removable by releasing at least one removable connection pin 174 which is releasable without a tool. This is preferably a spring loaded ball lock pin.

The lower screw feed guide 180 is located below the upper screw feed guide 150, 150' and includes a shaft groove 184L, 184R as well as a head groove 186L, 186R formed in two plates 182L, 182R, which are merely pressed together to define the grooves and inserted between receiving bars 202 on nose piece 190 that receive the lower screw feed guide plates 182L, 182R. A connection hole 189 is provided through the lower screw feed guide plates 182L, 182R which, in the installed position, is aligned with the mounting holes 203 in the receiving bars 202 such that a removable connection pin 204 can be inserted therethrough, with the connection pin 204 being removable without the need for tools. Preferably, inspection windows 188 are also located in the lower screw feed guide plates 182L, 182R to allow for identifying the location of a jam in the threaded fastener feed.

Figures 25A, 25B, 25C, 26:
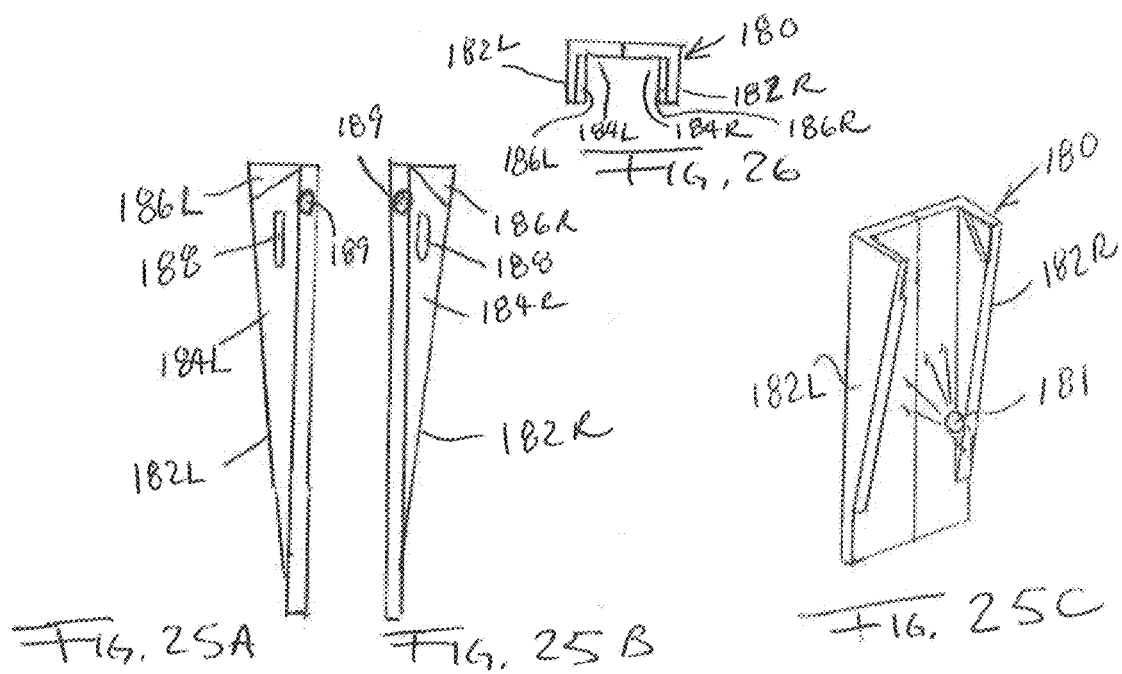
FIGS. 25A and 25B are side views of the plates forming the lower screw feed guide.
FIG. 25C is a view of an alternate arrangement of the lower screw feed guide including a light source to allow an operator to detect if a threaded fastener is in the screw feed arrangement.
FIG. 26 is a top view of the plates forming the lower screw feed guide shown in an assembled position.

In order to allow for easier inspection of whether a threaded fastener 12 upper screw feed tube 142, the upper screw feed guide 150, or in the lower screw feed guide 180, as shown in FIG. 25C, optionally a light source 181, such as an LED, can be mounted on or in at least one of the lower screw feed guide plates 182L, 182R and is arranged to shine a light up through the screw feed arrangement 140, including the lower screw feed guide 180, the upper screw feed guide 150, and the upper screw feed tube 142, such that an operator can identify whether a threaded fastener 12 is located in the lower screw feed assembly by looking down the screw feed tube and observing whether the light is visible. As a further alternative, one or more break beam sensors could be provided along the path defined by the screw feed arrangement 140 to detect the position of a threaded fastener 12 that has been inserted, and provide a visual indicator to the operator of the position of the fastener 12 in the screw feed arrangement. This could also be provided for the nose piece 190.

Referring to FIGS. 1, 27, and 28, a nose piece 190 is located in the nose piece receiving grooves 40L, 40R in the sidewalls 36L, 36R. The nose piece 190 includes a drive shaft tube 192 having at least one head receiving slot 196, 197 connected to a shaft receiving slot 194 in a sidewall of the driveshaft tube 192. The fastener guide grooves 160L, 160R of the upper screw feed guide 150 and shaft guide groove 184L, 184R of the lower screw feed guide 180 are aligned with the shaft receiving slot 194. Additionally, preferably the head guide groove 162L, 162R of the first embodiment of the upper screw feed guide 150 for longer screws, is aligned with a head receiving slot 196 in an upper location on the drive shaft tube 192, while the head guide groove 186L, 186R on the lower screw feed guide is aligned with the lower head receiving slot 197 on the drive shaft tube 192. These are aligned so that upon insertion of the threaded fastener 12 in the upper screw feed tube 142, the threaded fastener 12 is adapted to be fed by gravity through the upper and lower screw feed guides 150, 150'; 180 into the drive shaft tube 192 such that it is engaged by the drive shaft 134 upon downward movement of the handle telescoping tube 24 via the handle cross member 26 and inserted through the center hole 16 of the washer plate 14, 14', 14", 14''' in the washer plate installation area 52 as the drive shaft 192 rotates to install the threaded fastener 12 along with the washer plate 14, 14', 14", 14'''.

As shown in FIG. 28, the nose piece 190 preferably includes receiving bars 202, as discussed above, for receiving and securing the lower screw feed plates 182L, 182R which are held together to form the lower screw feed guide 180. The connection pin 204 is inserted through the connection holes 189 as well as the mounting holes 203 to hold the lower screw feed guide 180 in position, with the connection pin 204 being releasable without a tool.

Still with reference to FIGS. 27 and 28, the nose piece 190 includes the mounting plate 198 for attachment of the upper screw feed guide 150, 150' including a mounting hole 200 defined therethrough to receive the connection pin 174. Here, the connection pin 174 is again of the type that is releasable without a tool which, in the installed position, extends through the aligned mounting holes 200, 172 in order to attach the upper screw feed guide 150, 150' to the nose piece 190. As noted above, the removable connection pin 156 is located through the mounting holes 170 and the mounting opening 154 in order to secure the upper screw feed guide 150 to the frame 20, and thus the nose piece 190 is securely mounted. As shown in FIG. 28, the nose piece 190 includes lever mounts 206 on the drive shaft tube 192. Jaw levers 208 are connected to the lever mounts 206 via pivotable connections, and jaw carriers 210, preferably in the form of a hollow tube, are located at a delivery end of the drive shaft tube 192. Jaws 214, shown in broken lines in FIG. 28, are slideably located inside the jaw carriers 210 and are biased toward one another by jaw springs 216, shown in broken lines in FIG. 28. The jaw springs 216 bias the jaws 214 toward one another to engage a threaded fastener 12 delivered to the nose piece 190. Here, the jaws 214 preferably include tapered surfaces at the fastener receiving side so that they are adapted to be opened by a force of the drive shaft 134 pressing the threaded fastener 12 downwardly during installation.

Preferably, the jaw carriers 210 have rounded ends that are received in the nose piece grooves 40L, 40R in the side walls 36L, 36R, as shown in FIG. 27.

The connection pins 130, 156, 174, 204 discussed herein are preferably of the type known to those of ordinary skill in the art and include a spring loaded releasable ball detent at the end to allow the ball to move inwardly in order to release the pin 130, 156, 174, 204 by force. However, other types of hand-releasable pins that do not require a tool can be used. Further, these pins 130, 156 174, 204 are preferably connected via lanyards to the installation tool 10 so that they are not easily lost.

In order to install a threaded fastener 12 through a washer plate 14, 14', 14", 14''' using the installation tool 10, the removable washer plate guide assembly 94 is set in the proper position for the particular washer plate 14, 14', 14", 14''' being used, with the removable washer plate guide assembly 94 being oriented in the proper direction based on the plate guide groove markings 44, 44', 44" provided at the top of the sidewalls 36L, 36R in the area of the plate guide grooves 42L, 42R; 42L', 42R'; 42L", 42R". A stack of washer plates 14, 14', 14", 14''' is loaded in the washer plate loading area 51. A weight 18, shown in FIG. 17, may be placed on the stack. The handle 26 is then pressed downwardly to slidably move the handle telescoping tube 24 downwardly in the handle base tube 22 to the install position such that the shuttle link 88 connected between the shuttle 70 and the handle telescoping tube 24 slidingly moves the shuttle 70 to the loading position, shown in FIGS. 15 and 16. Upon releasing the handle 26, the return force generated by the spring 28 raises the handle telescoping tube 24 to the ready position causing sliding movement of the shuttle 70 to the delivery position, seen in FIGS. 14 and 20. The catch lip 86, 86' of the shuttle 70 engages a bottom most one of the washer plates 14, 14', 14", 14''' in the stack as the shuttle 70 begins a return movement, carrying one washer plate 14, 14', 14", 14''' into the washer plate installation area 52 against the adjustable plate stop 54 where it contacts the stop face 55 such that the center hole 16 is located in an aligned position with the drive shaft 134 which is aligned with and extends into an upper part of the drive shaft tube 192 of the nose piece 190. An operator drops a threaded fastener 12 into the upper screw feed tube 142, as represented in FIG. 1, and the threaded fastener 12 slides down through the upper screw feed guide 150, 150' and the lower screw feed guide 180 into the drive shaft tube 192 of the nose piece 190 to a ready position. Here, the fastener 12 is preferably held by the jaws 214 which are biased toward one another via the springs 216. The operator then presses the handle 26 downwardly again to slidably move the handle telescoping tube 24 downwardly in the handle base tube 22 to the install position such that the shuttle link 88 connected between the shuttle 70 and the handle telescoping tube 24 slidingly moves the shuttle 70 to the loading position, with the spring gate assembly 50A on the medial wall 48 preventing a return of the plate washer 14, 14', 14", 14''' in the installation position from staying on the shuttle 70 and returning with it to the loading position. With the drive motor 132 turning the drive shaft 134, the drive shaft 134 is moved downwardly along with the handle telescoping tube 24 and engages a head of the threaded fastener 12 in the drive shaft tube 192, and presses the threaded fastener 12 downwardly through the hole 16 in the washer 14, 14', 14", 14''' and into a surface to be engaged by the fastener 12, and rotatingly drives the threaded fastener 12 into the surface. Here, movement of the threaded fastener 12 downwardly causes the jaws 214 to be spread apart with the spreading action being enhanced by a taper located on the upper jaw surfaces.

For ease of maintenance, the drive assembly 120 can be easily removed from the frame 20 by removing the connection pins 130 from the pin openings 124, 128 in the motor handle mount 122 and the motor clamp mount 126, without the need for a tool. This is schematically illustrated in FIG. 23A. The drive assembly 120 including the drive shaft 134 can then be placed aside. The upper screw feed guide 150, 150' can then also be removed by removing the connection pin 156 from the mounting holes 170 and the hole 154 in the upper screw feed attachment mount 152 as well as removing the connection pin 174 from the mounting holes 172 in the mounting plates 168 and the mounting plate 198 on the nose piece 190. These connection pins 156, 174 are also removable by hand without the need for any tools. At that point, the upper screw feed guide 150, 150' can be removed and hinged open, as shown in FIGS. 31B and 33B. To the extent that the inspection windows 164L, 164R are provided, these can be utilized in advance to determine a jam location of a threaded fastener 12. At this point, the connection pin 204 that extends through the holes in the receiving bars 202 on the nose piece 190 and the mounting holes 189 on the lower screw feed guide plates 182L, 182R can also be removed, and the lower screw feed guide 180 slid upwardly and out from the nose piece. Now, with the three connector pins 156, 174, 204 in the upper screw feed guide 150, 150' and the lower screw feed guide 180 having been removed, the nose piece 190 can be slid upwardly in the nose piece grooves 40L, 40R and removed from the base 32 of the frame 20. This arrangement allows for easy disassembly, inspection, and jam removal by the simple removal of five connection pins 130, 156, 174, 204 which can all be removed without the need for tools. Reassembly is accomplished in the reverse order in a simple and intuitive fashion.

Additionally, to the extent that shorter or longer screws are required, the first embodiment of the upper screw feed guide 150 for longer screws and the second embodiment of the upper screw feed guide 150' for shorter screws can be easily interchanged by the simple removal and reinstallation of the two connector pins 156, 174 that secure the upper screw feed guide 150, 150' which can be easily accomplished without tools.

As previously noted, all of the connector pins are preferably spring loaded ball lock pins to allow for easy one handed removal. Preferably, all of the connector pins are also connected via lanyards to the frame 20 or other components that are fixed to the frame or other mounting hardware.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

The invention claimed is:

1. A fastener installation tool for installing threaded fasteners through a washer plate having a center hole, comprising:
   a frame having a base, a handle base tube connected to the base, a handle telescoping tube slidably movable in the handle base tube, a handle attached to the handle telescoping tube, and a spring that biases the handle telescoping tube away from the base;
   the base including first and second sidewalls that are connected to the handle base tube, the sidewalls including inner facing sides, the inner facing sides each including: an opposing shuttle groove that extends generally horizontally in a use position of the installation tool along a bottom of the base, an opposing nose piece receiving groove that extends upwardly in the use position, and a plurality of opposing plate guide grooves that extend upwardly in the use position, and a medial wall located between the sidewalls;

a removable washer plate guide wall assembly having opposing sides that are slidably received in one pair of the opposing plate guide grooves to define a plate loading area for a stack of washer plates between the sidewalls and the medial wall, and a washer plate installation area being located between the sidewalls between the medial wall and an adjustable plate stop adjustably connected to the base;

a shuttle having a base plate with two opposite edges that are received in the opposing shuttle grooves in the sidewalls for sliding movement of the shuttle between a loading position and a delivery position beneath the medial wall, the base plate further including a slot facing the washer plate installation area, the slot defining two support arms for a bottom one of the washer plates in the stack in the loading position, and a catch lip located on the base plate in a medial portion that is adapted to catch a distal edge of the bottom most washer plate in the stack in the loading position, the shuttle carrying the bottom most washer plate in the stack beneath the medial wall to the delivery position in the washer plate installation area by the sliding movement thereof;

a shuttle link connected between the shuttle and the handle telescoping tube, such that a downward movement of the handle telescoping tube to an install position is transmitted by the shuttle link to cause the sliding movement of the shuttle to the loading position, and a return force generated by the spring to raise the handle telescoping tube to a ready position causes the sliding movement of the shuttle to the delivery position where the washer plate is adapted to contact the adjustable plate stop;

a spring gate assembly containing a scraper on the medial wall adapted to prevent a return of a washer plate from the installation position upon the shuttle being moved to the loading position;

wheels connected to the base;

a drive assembly including a drive shaft connected to the handle telescoping tube; the drive shaft being aligned with a center of the washer plate installation area which is adapted to correspond with the center of the washer plate being installed; and a screw feed arrangement, comprising an upper screw feed tube attached to the handle base tube, an upper screw feed guide located beneath the upper screw feed tube and connected to an upper screw feed attachment mount connected to the handle base tube, the upper screw feed guide including a fastener guide groove, and a lower screw feed guide located below the upper screw feed guide and including a fastener guide groove, and a nose piece located in the nose piece receiving grooves in the sidewalls, the nose piece including a drive shaft tube having a fastener receiving slot in a sidewall thereof aligned with the head guide groove and the shaft guide grooves so that upon insertion of the threaded fastener in the upper screw feed tube, the threaded fastener is adapted to be fed by gravity through the upper and lower screw feed guides into the drive shaft tube such that it is engaged by the drive shaft upon the downward movement of the handle telescoping tube and inserted through the center hole in the washer plate in the washer installation area as the drive shaft rotates to install the threaded fastener and the washer plate.

2. The installation tool of claim 1, further comprising at least one locking pin connected to the handle base tube that is adapted to extend over the handle telescoping tube in order to lock the tool in the install position for safety during maintenance and for compact storage.

3. The installation tool of claim 1, wherein the removable washer plate guide wall assembly is installable in different ones of the opposing pairs of opposing plate guide grooves to adjust a size and shape of the plate loading area for receiving washer plates of different sizes and shapes.

4. The installation tool of claim 3, wherein the removable washer plate guide wall assembly has an H-shape in cross-section, and upper arms of the H have a tapered portion adapted to hold circular washer plates.

5. The installation tool of claim 3, wherein at least one of the sidewalls includes graphic markings at the opposing plate guide grooves illustrating different positions of the removable washer plate guide wall assembly.

6. The installation tool of claim 1, wherein the plate stop is connected to a plate stop adjustment lever to adjust a stop position for different sized washer plates, the plate stop adjustment lever being engagable by a lever retainer having a plurality of fixed positions corresponding to different sized washer plates.

7. The installation tool of claim 1, wherein the shuttle base plate includes a recess for receiving the plate washer.

8. The installation tool of claim 1, wherein the shuttle base plate includes a blade recess, and a blade body with a blade body is mounted to the base plate, and the blade defines the catch lip.

9. The installation tool of claim 8, wherein the blade is curved or straight.

10. The installation tool of claim 1, further comprising recesses defined in the sidewalls in which the shuttle links are located, and cover plates located over the cavities.

11. The installation tool of claim 1, wherein the drive motor is connected to a motor clamp mount having at least two pin openings, which is connected to a motor handle mount that extends from the handle telescoping tube that includes two complementarily aligned pin openings via removable pins.

12. The installation tool of claim 1, wherein the upper screw feed guide comprises two grooved plates hingedly connected to one another that in a closed position define the fastener guide groove in the upper screw feed guide, at least one inspection window extending through the plates, and a mounting hole located through the plates that is aligned with a mounting opening in an upper screw feed attachment mounting post on the frame, and a removable connection pin located in the mounting hole and the mounting opening to secure the upper screw feed guide to the frame.

13. The installation tool of claim 1, wherein the fastener guide groove in the upper screw feed guide includes a head guide groove and a shaft guide groove, the head guide groove having a wider width than the shaft guide groove, and the fastener receiving slot in the sidewall of the nose piece includes an aligned head receiving slot and a shaft receiving slot.

14. The installation tool of claim 1, wherein at least two of the upper screw feed guides are provided having different ones of the shaft guide grove and the head guide groove configurations for different sized threaded fasteners, the upper screw feed guides being removable by releasing at least one removable connection pin which is releasable without a tool.

15. The installation tool of claim 1, wherein the lower screw feed guide includes two lower guide plates having grooves defined therein that form a guide channel and are separable to expose the guide channel, and an inspection window located in an aligned position through the lower guide plates.

16. The installation tool of claim 15, wherein the nose piece includes receiving bars for the two lower guide plates, and a connection pin that is releasable without a tool extending through aligned mounting holes in the receiving bars and the two lower guide plates.

17. The installation tool of claim 1, wherein the nose piece includes a mounting plate for connection to the upper screw feed guide, with a connection pin that is releasable without a tool extending through aligned mounting holes in the mounting plate and the upper screw feed guide.

18. The installation tool of claim 1, wherein the nose piece includes lever mounts on the drive shaft tube, and jaw levers pivotably connected to the lever mounts, and jaw carriers are located at a delivery end of the drive shaft tube, with jaws being slidably located in the jaw carriers that are biased toward one another by jaw springs in order to engage a threaded fastener delivered to the nose piece, the jaws being adapted to be opened by a force of the drive shaft pressing the threaded fastener downwardly during installation, or by the jaw levers in the event of a jam.

19. The installation tool of claim 18, wherein the jaw carriers include rounded ends that are received in the nose piece grooves in the sidewalls.

20. A method of installing threaded fasteners through a washer plate using the installation tool of claim 1, comprising:
  loading a stack of the washer plates in the plate loading area;
  pressing the handle downwardly to slidably move the handle telescoping tube downwardly in the handle base tube to the install position such that the shuttle link connected between the shuttle and the handle telescoping tube slidingly moves the shuttle to the loading position;
  releasing the handle such that the return force generated by the spring raises the handle telescoping tube to the ready position causing sliding movement of the shuttle to the delivery position, the catch lip of the shuttle engaging a bottom most one of the washer plates in the stack as the shuttle begins a return movement, elevating the stack of washer plates above the bottom most washer plate and carrying the bottom most washer plate into washer plate installation area against the adjustable plate stop;
  dropping a threaded fastener into the upper screw feed tube, the threaded fastener sliding down through the upper screw feed guide and the lower screw feed guide into the drive shaft tube to a ready position;
  pressing the handle downwardly again to slidably move the handle telescoping tube downwardly in the handle base tube to the install position such that the shuttle link connected between the shuttle and the handle telescoping tube slidingly moves the shuttle to the loading position, with the spring gate assembly on the medial wall preventing a return of the washer plate from the installation position, the drive motor turning the drive shaft as the drive shaft is moved downwardly with the handle and engaging a head of the threaded fastener in the drive shaft tube, pressing the threaded fastener downwardly through the hole in the washer and into a surface to be engaged by the threaded fastener, and rotatingly driving the threaded fastener into the surface.

21. A method of disassembling the installation tool of claim 1, comprising manually removing the connection pins without any tools, removing the drive motor with the motor clamp mount from the motor handle mount, removing the upper screw feed guide and opening the two grooved plates that are hingedly connected to one another, sliding out the lower screw feed guide and separating the two lower guide plates, and sliding the nose piece upwardly and out of the opposing nose piece receiving grooves.

* * * * *